(12) United States Patent
Miller et al.

(10) Patent No.: US 8,896,970 B1
(45) Date of Patent: Nov. 25, 2014

(54) BALANCED CO-LOCATED GIMBAL-BASED DUAL STAGE ACTUATION DISK DRIVE SUSPENSIONS

(71) Applicant: Hutchinson Technology Incorporated, Hutchinson, MN (US)

(72) Inventors: Mark A. Miller, Darwin, MN (US); Joseph C. Wheatley, Hutchinson, MN (US); Nole D. German, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/145,515

(22) Filed: Dec. 31, 2013

(51) Int. Cl.
*G11B 5/56* (2006.01)
*G11B 21/24* (2006.01)
*G11B 5/48* (2006.01)

(52) U.S. Cl.
CPC .................. *G11B 5/4833* (2013.01)
USPC .................. 360/294.6; 360/294.4

(58) Field of Classification Search
CPC .................. G11B 5/5552; G11B 5/4873
USPC .................. 360/294.1–294.4, 294.6
See application file for complete search history.

(56) References Cited

U.S. PATENT DOCUMENTS

| | | |
|---|---|---|
| 3,320,556 A | 5/1967 | Schneider |
| 4,418,239 A | 11/1983 | Larson et al. |
| 4,422,906 A | 12/1983 | Kobayashi |
| 4,659,438 A | 4/1987 | Werner et al. |
| 5,140,288 A | 8/1992 | Grunwell |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |

(Continued)

FOREIGN PATENT DOCUMENTS

| | | |
|---|---|---|
| EP | 0591954 B1 | 4/1994 |
| EP | 0834867 B1 | 5/2007 |

(Continued)

OTHER PUBLICATIONS

International Search Report and Written Opinion issued in PCT/US2013/031484, mailed May 30, 2013, 13 pages.
U.S. Appl. No. 13/365,443 entitled Elongated Trace Tethers for Disk Drive Head Suspension Flexures, filed Feb. 3, 2012.
U.S. Appl. No. 13/690,883 entitled Microstructure Patterned Surfaces for Integrated Lead Head Suspensions, filed Nov. 30, 2012.
U.S. Appl. No. 13/827,622 entitled Mid-Loadbeam Dual Stage Actuated (DSA) Disk Drive Head Suspension, filed Mar. 14, 2013.

(Continued)

*Primary Examiner* — Wayne Young
*Assistant Examiner* — Adam B Dravininkas
(74) *Attorney, Agent, or Firm* — Faegre Baker Daniels LLP

(57) ABSTRACT

Various embodiments concern a suspension having a DSA structure on a gimbaled flexure comprising a loadbeam having a load point dimple and a flexure attached to the loadbeam. The flexure comprising a metal layer having a pair of spring arms, a tongue located between the spring arms, and a pair of struts. The struts connect the pair of spring arms to the tongue. One of the struts is located distal of the other strut. The pair of struts has a midline centered between the pair of struts. The suspension further comprises a motor mounted on the flexure. Electrical activation of the motor bends the pair of struts to rotate the tongue about an axis of rotation. The axis of rotation is aligned with the dimple. The midline is offset distally or proximally with respect to the axis of rotation. The offset counters a mass in imbalance of the tongue.

30 Claims, 16 Drawing Sheets

(56) References Cited

U.S. PATENT DOCUMENTS

| | | |
|---|---|---|
| 5,491,597 A | 2/1996 | Bennin et al. |
| 5,521,778 A | 5/1996 | Boutaghou et al. |
| 5,598,307 A | 1/1997 | Bennin |
| 5,608,590 A | 3/1997 | Ziegler et al. |
| 5,608,591 A | 3/1997 | Klaassen |
| 5,631,786 A | 5/1997 | Erpelding |
| 5,636,089 A | 6/1997 | Jurgenson et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,717,547 A | 2/1998 | Young |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,862,010 A | 1/1999 | Simmons et al. |
| 5,889,137 A | 3/1999 | Hutchings et al. |
| 5,892,637 A | 4/1999 | Brooks, Jr. et al. |
| 5,898,544 A | 4/1999 | Krinke et al. |
| 5,914,834 A | 6/1999 | Gustafson |
| 5,921,131 A | 7/1999 | Stange |
| 5,924,187 A | 7/1999 | Matz |
| 5,973,882 A * | 10/1999 | Tangren .............. 360/245.6 |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,046,887 A | 4/2000 | Uozumi et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,195,227 B1 | 2/2001 | Fan et al. |
| 6,215,622 B1 | 4/2001 | Ruiz et al. |
| 6,229,673 B1 | 5/2001 | Shinohara et al. |
| 6,233,124 B1 * | 5/2001 | Budde et al. .............. 360/294.4 |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,320,730 B1 | 11/2001 | Stefansky et al. |
| 6,330,132 B1 | 12/2001 | Honda |
| 6,349,017 B1 | 2/2002 | Schott |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,490,228 B2 | 12/2002 | Killam |
| 6,493,190 B1 | 12/2002 | Coon |
| 6,493,192 B2 | 12/2002 | Crane et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansaky |
| 6,639,761 B1 | 10/2003 | Boutaghou et al. |
| 6,647,621 B1 | 11/2003 | Roen et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,791,802 B2 | 9/2004 | Watanabe et al. |
| 6,796,018 B1 | 9/2004 | Thonton |
| 6,798,597 B1 | 9/2004 | Aram et al. |
| 6,801,402 B1 | 10/2004 | Subrahmanyam et al. |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |

(56) References Cited

U.S. PATENT DOCUMENTS

| | | | |
|---|---|---|---|
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,385,788 B2 | 6/2008 | Kubota et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| 7,625,654 B2 | 12/2009 | Vyas et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,821,742 B1 | 10/2010 | Mei |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando |
| 8,161,626 B2 | 4/2012 | Ikeji |
| 8,169,746 B1 | 5/2012 | Rice et al. |
| 8,174,797 B2 | 5/2012 | Iriuchijima |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 * | 8/2012 | Greminger ................. 360/244.5 |
| 8,259,416 B1 | 9/2012 | Davis et al. |
| 8,264,797 B2 | 9/2012 | Emley |
| 8,289,652 B2 | 10/2012 | Zambri et al. |
| 8,295,012 B1 | 10/2012 | Tian et al. |
| 8,300,362 B2 | 10/2012 | Virmani et al. |
| 8,310,790 B1 * | 11/2012 | Fanslau, Jr. ................. 360/294.4 |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,542,465 B2 | 9/2013 | Liu et al. |
| 8,559,137 B2 | 10/2013 | Imuta |
| 8,665,565 B2 | 3/2014 | Pro et al. |
| 8,675,314 B1 | 3/2014 | Bjorstrom et al. |
| 8,681,456 B1 | 3/2014 | Miller et al. |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2002/0176209 A1 | 11/2002 | Schulz et al. |
| 2003/0011118 A1 | 1/2003 | Kasajima et al. |
| 2003/0011936 A1 | 1/2003 | Himes et al. |
| 2003/0053258 A1 | 3/2003 | Dunn et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0027727 A1 | 2/2004 | Shimizu et al. |
| 2004/0027728 A1 * | 2/2004 | Coffey et al. ................. 360/313 |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 * | 8/2006 | Kwon et al. ................. 360/294.4 |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0274452 A1 | 12/2006 | Arya |
| 2006/0274453 A1 | 12/2006 | Arya |
| 2006/0279880 A1 | 12/2006 | Boutaghou et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 * | 6/2009 | Huang et al. ................. 360/294.4 |
| 2009/0176120 A1 | 7/2009 | Wang |
| 2009/0190263 A1 | 7/2009 | Miura et al. |
| 2009/0244786 A1 * | 10/2009 | Hatch ................. 360/294.4 |
| 2009/0294740 A1 | 12/2009 | Kurtz et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195252 A1 | 8/2010 | Kashima |
| 2010/0208390 A1 | 8/2010 | Hanya et al. |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0290158 A1 | 11/2010 | Hanya et al. |
| 2011/0013319 A1 | 1/2011 | Soga et al. |
| 2011/0058282 A1 | 3/2011 | Fujimoto et al. |

(56) References Cited

U.S. PATENT DOCUMENTS

| | | | |
|---|---|---|---|
| 2011/0096438 A1 | 4/2011 | Takada et al. | |
| 2011/0123145 A1* | 5/2011 | Nishio | 385/14 |
| 2011/0141624 A1 | 6/2011 | Fuchino et al. | |
| 2011/0228425 A1 | 9/2011 | Liu et al. | |
| 2011/0242708 A1 | 10/2011 | Fuchino | |
| 2011/0279929 A1 | 11/2011 | Kin | |
| 2011/0299197 A1 | 12/2011 | Eguchi | |
| 2012/0002329 A1 | 1/2012 | Shum et al. | |
| 2012/0113547 A1 | 5/2012 | Sugimoto | |
| 2012/0281316 A1 | 11/2012 | Fujimoto et al. | |
| 2013/0242434 A1* | 9/2013 | Bjorstrom et al. | 360/234.4 |
| 2013/0242436 A1 | 9/2013 | Yonekura et al. | |
| 2013/0265674 A1* | 10/2013 | Fanslau | 360/245.3 |
| 2014/0022670 A1 | 1/2014 | Takikawa et al. | |
| 2014/0022671 A1 | 1/2014 | Takikawa et al. | |
| 2014/0022674 A1 | 1/2014 | Takikawa et al. | |
| 2014/0022675 A1* | 1/2014 | Hanya et al. | 360/244.5 |
| 2014/0063660 A1 | 3/2014 | Bjorstrom et al. | |
| 2014/0078621 A1 | 3/2014 | Miller et al. | |
| 2014/0098440 A1 | 4/2014 | Miller et al. | |

FOREIGN PATENT DOCUMENTS

| | | | |
|---|---|---|---|
| JP | 9198825 A | 7/1997 | |
| JP | 10003632 A | 1/1998 | |
| JP | 2001057039 A | 2/2001 | |
| JP | 2001202731 A | 7/2001 | |
| JP | 2001307442 A | 11/2001 | |
| JP | 2002050140 A | 2/2002 | |
| JP | 2002170607 A | 6/2002 | |
| JP | 2003223771 A | 8/2003 | |
| JP | 2004039056 A | 2/2004 | |
| JP | 2004300489 A | 10/2004 | |
| JP | 2005209336 A | 8/2005 | |
| WO | WO9820485 A1 | 5/1998 | |

OTHER PUBLICATIONS

U.S. Appl. No. 14/056,481 entitled Two-Motor Co-Located Gimbal-Based Dual Stage Actuation Disk Drive Suspensions With Motor Stiffeners, filed Oct. 17, 2013.
U.S. Appl. No. 14/103,955 entitled Electrical Contacts to Motors in Dual Stage Actuated Suspensions, filed Dec. 12, 2013.
U.S. Appl. No. 14/141,617 entitled Disk Drive Suspension Assembly Having a Partially Flangeless Load Point Dimple, filed Dec. 27, 2013, 53 pages.
U.S. Appl. No. 13/955,204 entitled Damped Dual Stage Actuation Disk Drive Suspensions, filed Jul. 31, 2013.
U.S. Appl. No. 13/972,137 entitled Co-Located Gimbal-Based Dual Stage Actuation Disk Drive Suspensions With Offset Motors, filed Aug. 21, 2013.
U.S. Appl. No. 14/026,427 entitled Co-Located Gimbal-Based Dual Stage Actuation Disk Drive Suspensions, filed Sep. 13, 2013.
U.S. Appl. No. 14/044,238 entitled Co-Located Gimbal-Based Dual Stage Actuation Disk Drive Suspensions With Motor Stifeners, filed Oct. 2, 2013.
U.S. Appl. No. 14/050,060 entitled Co-Located Gimbal-Based Dual Stage Actuation Disk Drive Suspensions With Dampers, filed Oct. 10, 2013.
U.S. Appl. No. 13/955,204, to Bjorstrom, Jacob D. et al., Non-Final Office Action issued on Mar. 24, 2014, 7 pages.
U.S. Appl. No. 13/955,204, to Bjorstrom, Jacob D. et al., Non-Final Office Action issued on Oct. 29, 2013, 9 pages.
U.S. Appl. No. 13/955,204, to Bjorstrom, Jacob D. et al., Notice of Allowance issued on Jan. 7, 2014, 6 pages.
U.S. Appl. No. 13/955,204, to Bjorstrom, Jacob D. et al., Notice of Allowance issued on May 6, 2014, 5 pages.
U.S. Appl. No. 13/955,204, to Bjorstrom, Jacob D. et al., Response filed Apr. 18, 2014 to Non-Final Office Action issued on Mar. 24, 2014, 9 pages.
U.S. Appl. No. 13/955,204, to Bjorstrom, Jacob D. et al., Response filed Nov. 19, 2013 to Non-Final Office Action issued on Oct. 29, 2013, 11 pages.
U.S. Appl. No. 13/972,137, to Bjorstrom, Jacob D. et al., Non-Final Office Action issued Nov. 5, 2013.
U.S. Appl. No. 13/972,137, to Bjorstrom, Jacob D. et al., Notice of Allowance issued on Jan. 17, 2014, 5 pages.
U.S. Appl. No. 13/972,137, to Bjorstrom, Jacob D. et al., Response filed Dec. 2, 2013 to Non-Final Office Action issued Nov. 5, 2013, 12 pages.
U.S. Appl. No. 14/044,238 to Miller, Mark A., Non-Final Office Action issued on Feb. 6, 2014, 9 pages.
U.S. Appl. No. 14/044,238, to Miller, Mark A., Response filed Apr. 22, 2014 to Non-Final Office Action issued on Feb. 6, 2014, 11 pages.
U.S. Appl. No. 14/050,660, to Miller, Mark A. et al., Non-Final Office Action issued on Mar. 31, 2014, 9 pages.
International Search Report and Written Opinion issued in PCT/US2013/059702, dated Mar. 28, 2014, 9 pages.
Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).
Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.
Harris, N.R. et al., "A Multilayer Thick-film PZT Actuator for MEMs Applications", Sensors and Actuators A: Physical, vol. 132, No. 1, Nov. 8, 2006, pp. 311-316.
International Search Report and Written Opinion issued in PCT/US2013/052885, mailed Feb. 7, 2014, 13 pages.
International Search Report and Written Opinion issued in PCT/US2013/064314, dated Apr. 18, 2014, 10 pages.
Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).
Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.
Lengert, David et al., "Design of suspension-based and collocated dual stage actuated suspensions", Microsyst Technol (2012) 18:1615-1622.
Li, Longqiu et al., "An experimental study of the dimple-gimbal interface in a hard disk drive", Microsyst Technol (2011) 17:863-868.
Pichonat, Tristan et al., "Recent developments in MEMS-based miniature fuel cells", Microsyst Technol (2007) 13:1671-1678.
Raeymaekers, B. et al., "Investigation of fretting wear at the dimple/gimbal interface in a hard disk drive suspension", Wear, vol. 268, Issues 11-12, May 12, 2010, pp. 1347-1353.
Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.
Rajagopal, Indira et al., "Gold Plating of Critical Components for Space Applications: Challenges and Solutions", Gold Bull., 1992, 25(2), pp. 55-66.
U.S. Appl. No. 14/216,288 entitled Co-Located Gimbal-Based Dual Stage Actuation Disk Drive Suspension, filed Mar. 17, 2014, 84 pages.
U.S. Appl. No. 61/396,239 entitled Low Resistance Ground Joints for Dual Stage Actuation Disk Drive Suspensions, filed May 24, 2010, 16 pages.
Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.
International Search Report and Written Opinion issued in PCT/US13/75320, mailed May 20, 2014, 10 pages.

* cited by examiner

BALANCED CO-LOCATED GIMBAL-BASED DUAL STAGE ACTUATION DISK DRIVE SUSPENSIONS

TECHNICAL FIELD

The present invention relates to disk drives and suspensions for disk drives. In particular, the invention is a dual stage actuation (DSA) suspension having offset flexure struts.

BACKGROUND

DSA disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in the Okawara U.S. Patent Publication No. 2010/0067151, the Shum U.S. Patent Publication No. 2012/0002329, the Fuchino U.S. Patent Publication No. 2011/0242708 and the Imamura U.S. Pat. No. 5,764,444. DSA suspensions having actuation structures located on the loadbeam or gimbal portions of the suspension, i.e., distal to the spring or hinge region, are also known and disclosed, for example, in the Jurgenson U.S. Pat. No. 5,657,188, the Krinke U.S. Pat. No. 7,256,968 and the Yao U.S. Patent Publication No. 2008/0144225. Co-located gimbal-based DSA suspensions are disclosed in co-pending U.S. Provisional Application Nos. 61/700,972 and 61/711,988. All of the above-identified patents and patent applications are incorporated herein by reference in their entirety and for all purposes.

There remains a continuing need for improved DSA suspensions. DSA suspensions with enhanced performance capabilities are desired. The suspensions should be capable of being efficiently manufactured.

SUMMARY

Various embodiments concern a suspension having a DSA structure on a gimbaled flexure comprising a loadbeam having a load point dimple and a flexure attached to the loadbeam. The flexure comprises a metal layer defining a pair of spring arms, a tongue located between the spring arms, and a pair of elongated struts. The struts connect the pair of spring arms to the tongue. The longitudinal axes of the struts are parallel and offset with respect to each other. The midline between the pair of struts is equidistant from the pair of struts. The suspension further comprises a motor mounted on the flexure. Electrical activation of the motor bends the pair of struts to rotate the tongue about an axis of rotation. The axis of rotation is aligned with the dimple. The midline is offset from the axis of rotation and the dimple. The tongue comprises a center of mass that is not aligned with the axis of rotation. For example, the suspension may further comprise a heat-assisted magnetic recording element mounted on the tongue, wherein the center of mass of the tongue is imbalanced at least in part due to the heat-assisted magnetic recording element mounted on the tongue. The center of mass of the tongue can be located one of distally or proximally of the axis of rotation while the midline between of the struts is located the other of distally or proximally of the axis of rotation. The offset between the dimple and the midline between the struts counters a tendency of tongue to rotate about a first axis of rotation that is not aligned with the dimple. The suspension may further comprise a pair of traces, each trace comprising one or more insulated conductors, wherein the metal layer further comprises a base portion from which the pair of spring arms extend distally. The pair of traces can extend from the base portion to the tongue without extending laterally beyond the pair of spring arms. The metal layer can further comprise a pair of snake tethers that extend distally from the base portion, the pair of snake tethers respectively supporting the traces. In some cases, each trace comprises at least two flexible bends located between the spring arms.

Various embodiments concern a suspension having a DSA structure on a gimbaled flexure comprising a loadbeam having a load point dimple and a flexure attached to the loadbeam. The flexure comprising a metal layer defining a pair of spring arms, a tongue located between the spring arms, and a pair of struts. The struts connect the pair of spring arms to the tongue. One of the struts is located distal of the other strut. The pair of struts has a midline centered between the pair of struts. The suspension further comprises a motor mounted on the flexure. Electrical activation of the motor bends the pair of struts to rotate the tongue about an axis of rotation. The axis of rotation is aligned with the dimple. The midline is offset distally or proximally with respect to the axis of rotation. The offset counters a mass in imbalance of the tongue.

Various embodiments concern a suspension having a DSA structure on a gimbaled flexure comprising a loadbeam having a load point dimple and a flexure attached to the loadbeam. The flexure comprises a metal layer defining a pair of spring arms, a tongue located between the spring arms, and a pair of struts. The struts connect the pair of spring arms to the tongue. The pair of struts comprises a first strut and a second strut located distal of the first strut. The suspension further comprises a motor mounted on the flexure. Electrical activation of the motor bends the pair of struts to rotate the tongue about an axis of rotation. The first strut is located a first distance proximally of the axis of rotation. The second strut is located a second distance distally of the axis of rotation. The first distance is different than the second distance.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

DESCRIPTION OF THE INVENTION

Hard disk drive suspensions can be susceptible to unwanted swaying, particularly dual stage actuation (DSA) suspensions designed to articulate laterally over disk media. Various features that can be employed to prevent unwanted sway and/or arrest sway motion in DSA suspensions as presented herein.

Figure 1:
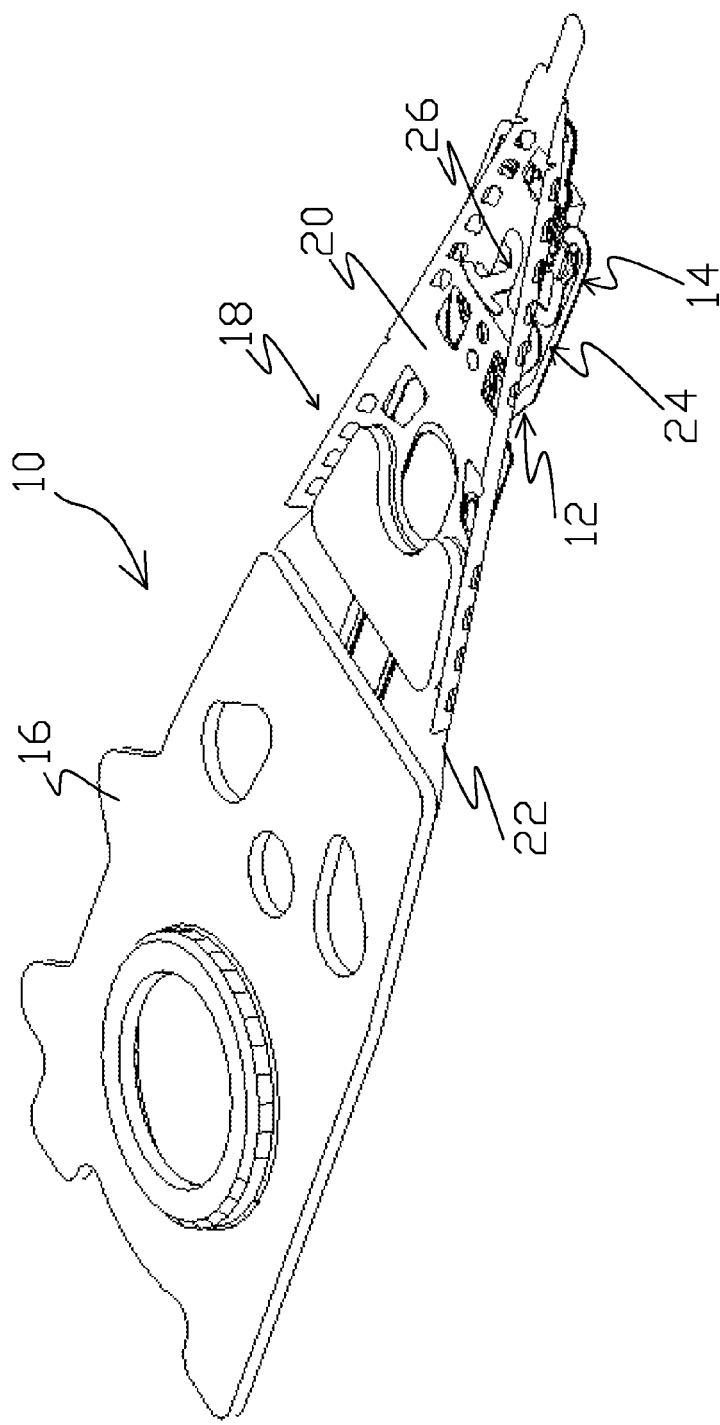
FIG. 1 is an isometric view of the loadbeam side of a suspension having a flexure with a dual stage actuation (DSA) structure.
Figure 2:
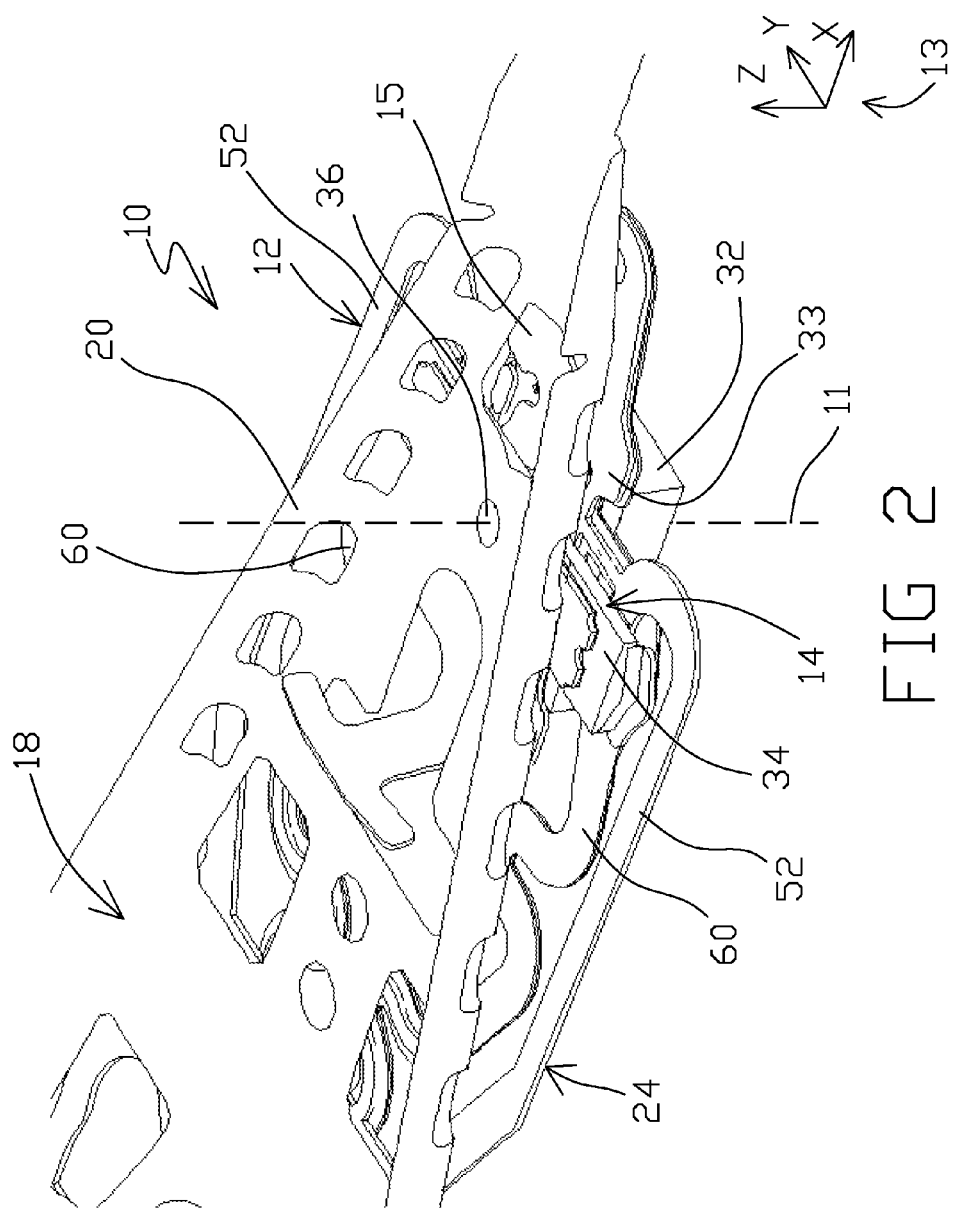
FIG. 2 is a detailed isometric view of the loadbeam side of the suspension of FIG. 1.

FIG. 1 is an isometric view of the loadbeam side of a suspension 10 having a flexure 12 with a co-located or gimbal-based DSA structure 14. FIG. 2 is a detailed isometric view of the loadbeam 18 and the DSA structure 14 of FIG. 1. The suspension 10 includes a baseplate 16 as a proximal mounting structure and a loadbeam 18 having a rigid or beam region 20 coupled to the baseplate 16 along a spring or hinge region 22. Each of the baseplate 16 and the loadbeam 18 can be formed from metal, such as stainless steel. A gimbal 24 is located at the distal end of the flexure 12. A DSA structure 14 is located on the gimbal 24, adjacent the distal end of the loadbeam 18. A head slider 32 is mounted to the gimbal 24 on the side of the flexure 12 that is opposite the loadbeam 18. One or more transducers (not shown) for reading and/or writing to disk media are located on and/or in the head slider 32.

The axes key 13 shown in FIG. 2 indicates X, Y, and Z axes. The suspension 10 is generally elongated along the X axis in distal and proximal directions. A longitudinal axis of the suspension 10 accordingly extends lengthwise along the suspension 10, parallel with the X-axis. Proximal and distal, as used herein, refers to the relative direction or position along the longitudinal axis of the suspension 10 while lateral refers to the left and right directions (along the Y-axis) orthogonal to the longitudinal axis of the suspension 10. For example, the baseplate 16 is proximal of the loadbeam 18 as shown in FIG. 1 while opposite ends of the motor 34 (shown in FIG. 4) extend laterally. The suspension 10, including the flexure 12 and the loadbeam 18, has a generally planar orientation co-planar with the X-Y plane. The Z axis represents height or bottom and top orientations. The Z axis is generally parallel with the axis of rotation 11.

Figure 3:
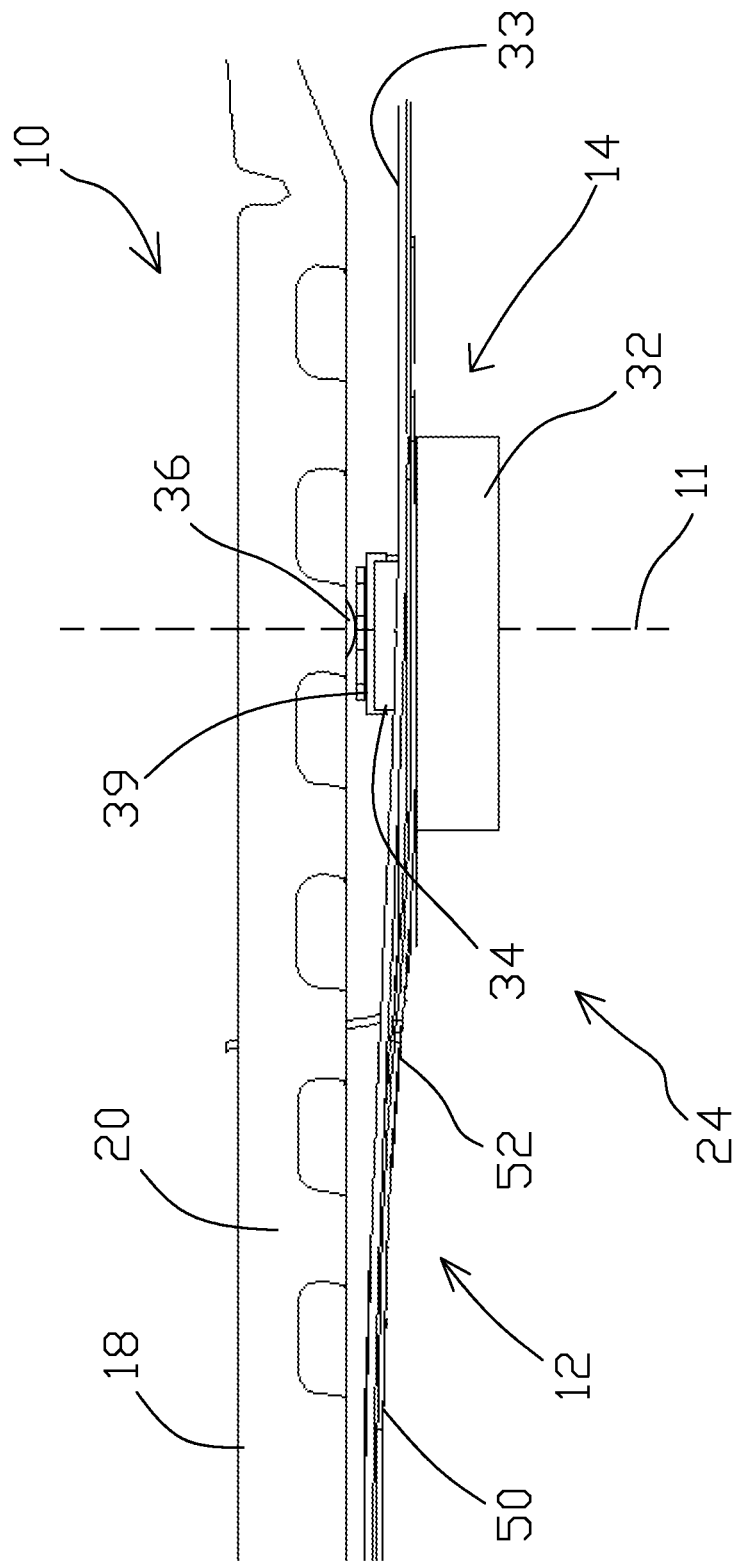
FIG. 3 is a side view of the suspension of FIGS. 1 and 2.

FIG. 3 is a side view of the suspension 10 of FIGS. 1 and 2. As shown, a dimple 36 is formed from the stainless steel substrate of the loadbeam 18. The dimple 36 projects from the bottom side of the loadbeam 18 and engages a stiffener 39. The stiffener 39 is an element that is mounted on a top side of a motor 34. The stiffener 39 provides a protective covering over the motor 34 and can electrically insulate the motor 34. In various alternative embodiments, the stiffener 39 is absent such that another element takes the place of the stiffener 39 or the dimple 36 directly engages the top side of the motor 34. The dimple 36 functions as a load point by urging the portion of the gimbal 24 to which the motor 34 is connected out of plane with respect to the base portion 50 of the flexure 12. The distal end of the flexure 12 is cantilevered from the base portion 50. The spring arms 52 apply a force through the tongue 33, motor 34, and stiffener 39 to maintain contact between the stiffener 39 and the dimple 36. Contact between the stiffener 39 and the dimple 36 allows the tongue 33 and head slider 32 to pitch and roll as needed during operation of the suspension 10, such as in response to vibration and/or wind generated by spinning disk media. The head slider 32 is mounted on the tongue 33. For example, the top side of the head slider 32 can be attached with adhesive to a slider mounting surface on the bottom side of the tongue 33. In conventional suspensions, the center of the dimple 36 is typically aligned with the center of the head slider 32 to center a gram load applied through the dimple 36 with the center of the head slider 32 to improve flight stability and optimize flight characteristics, however various embodiments of the present disclosure may depart from such convention as further discussed herein.

Figure 4:
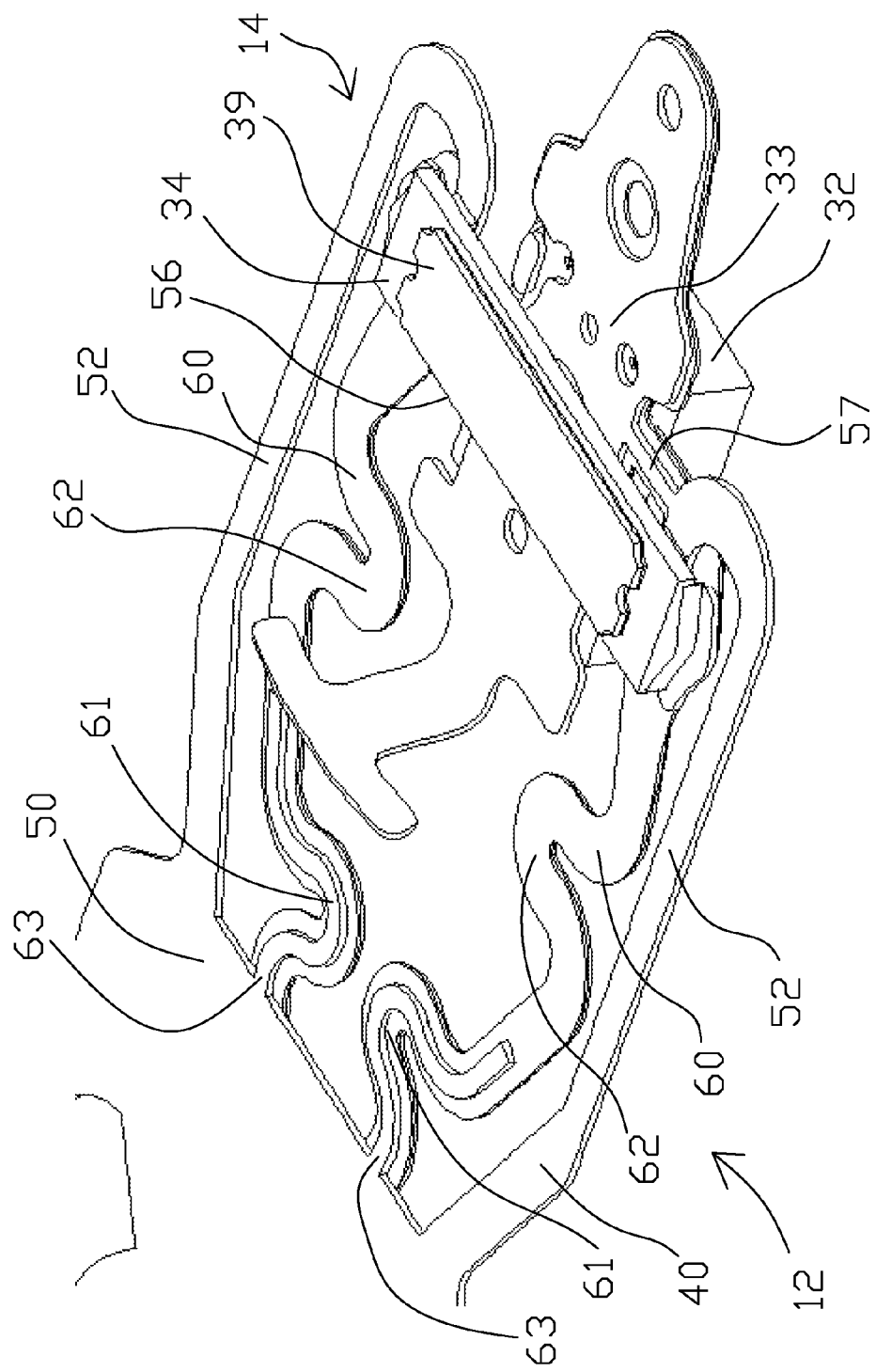
FIG. 4 is an isometric view of the flexure and DSA structure of the suspension of FIGS. 1-3.

FIG. 4 is an isometric view of the distal end of the flexure 12. The loadbeam 18 is absent in FIG. 4 to show greater detail of the flexure 12. The stiffener 39 has an asymmetric shape, with a distal arm on first lateral side of the stiffener 39 and a proximal arm on the second lateral side of the stiffener 39. Any type of stiffener or other component or configuration referenced in U.S. provisional patent application 61/711,988, filed Oct. 10, 2012, which is hereby incorporated by reference herein in its entirety, can be used in any embodiment of the present disclosure. The stiffener 39 can include an adhesive layer that attaches to the top surface of the motor 34.

The flexure 12 includes a stainless steel layer 40 (or other metal layer) that forms the main structure support of the flexure 12. The stainless steel layer 40 includes a base portion 50 which can be attached (e.g., by welding) to the loadbeam 18. The stainless steel layer 40 further includes a pair of spring arms 52, a tongue 33, and struts 56, 57 that respectively connect the pair of spring arms 52 to the tongue 33. Strut 56 is offset proximally of strut 57. In this way, the pair of struts 56, 57 can be referred to as a proximal strut 56 and a distal strut 57.

Traces 60 extend along the distal end of the flexure 12 between the pair of spring arms 52. The traces 60 comprise a dielectric base layer (e.g., a polymer such as polyimide) and at least one conductor extending along the base layer. The conductors can further be covered by a cover coat of the dielectric material. The traces 60 route the conductors along the suspension 10 to electrically connect components of the suspension 10 (e.g., transducers of the head slider 32) to control circuitry of the hard disk drive. Routing the traces 60 between the spring arms 52 minimizes the width of the distal end of the flexure 12 and minimizes the use of material as compared to routing the traces 60 outside of the pair of spring arms 52. In some embodiments, no part of either trace 60 extends laterally beyond either of the spring arms 52. For example, each trace 60 can extend from the base portion to the tongue 33 while being entirely between the lateral spring arms 52. In some embodiments, each trace 60 extends from the base portion 50 to the tongue 33 while no part of the trace 60 is laterally beyond either spring arm 52, wherein the trace 60 may overlap with a spring arm 52. In some alternative embodiments, each trace 60 extends from the base portion 50 to the tongue 33 substantially between the lateral spring arms 52, wherein a portion of each trace 60 may extend laterally beyond a spring arm 52 to a minor degree. It is noted that routing the traces 60 between the spring arms 52 may have a tendency to increase sway gain.

Each trace 60 includes a first bend 61 and a second bend 62. The first and second bends 61, 62 lowers gimbal 24 stiffness by providing sections that are prone to flexing at the bends 61, 62. Furthermore, each trace 60 includes a snake tether 63. The snake tethers 63 are part of the stainless steel layer 40 and extend distally from the base portion 50. The snake tethers 63 follow the contours of the trace 60, including the first bend 61. The snake tethers 63 structurally support the traces 60. The snake tethers 63 can be configured in any manner disclosed in commonly owned patent application Ser. No. 13/365,443, filed Feb. 3, 2012, titled ELONGATED TRACE TETHERS FOR DISK DRIVE HEAD SUSPENSION FLEXURES, which is incorporated by reference herein in its entirety for all purposes.

As shown in FIGS. 2-4, the DSA structure 14 includes a motor 34. The motor 34 can be a piezoelectric element. The motor 34 expands and contracts when electrically activated by a drive signal delivered by control circuitry of the hard disk drive. The motor 34 is mounted to the gimbal 24 of the flexure 12 between the loadbeam 18 and the head slider 32. As described in greater detail below, activation of the motor 34 rotates the tongue 33, and the head slider 32 mounted thereon, about an axis of rotation 11. The axis of rotation 11 is transverse to the planar orientation of the flexure 12 and the loadbeam 18. Rotation or other tracking of the head slider 32 provides fine position control of the read/write transducers of the head slider 32 to selectively scan over specific sectors of disk media.

Figure 5:
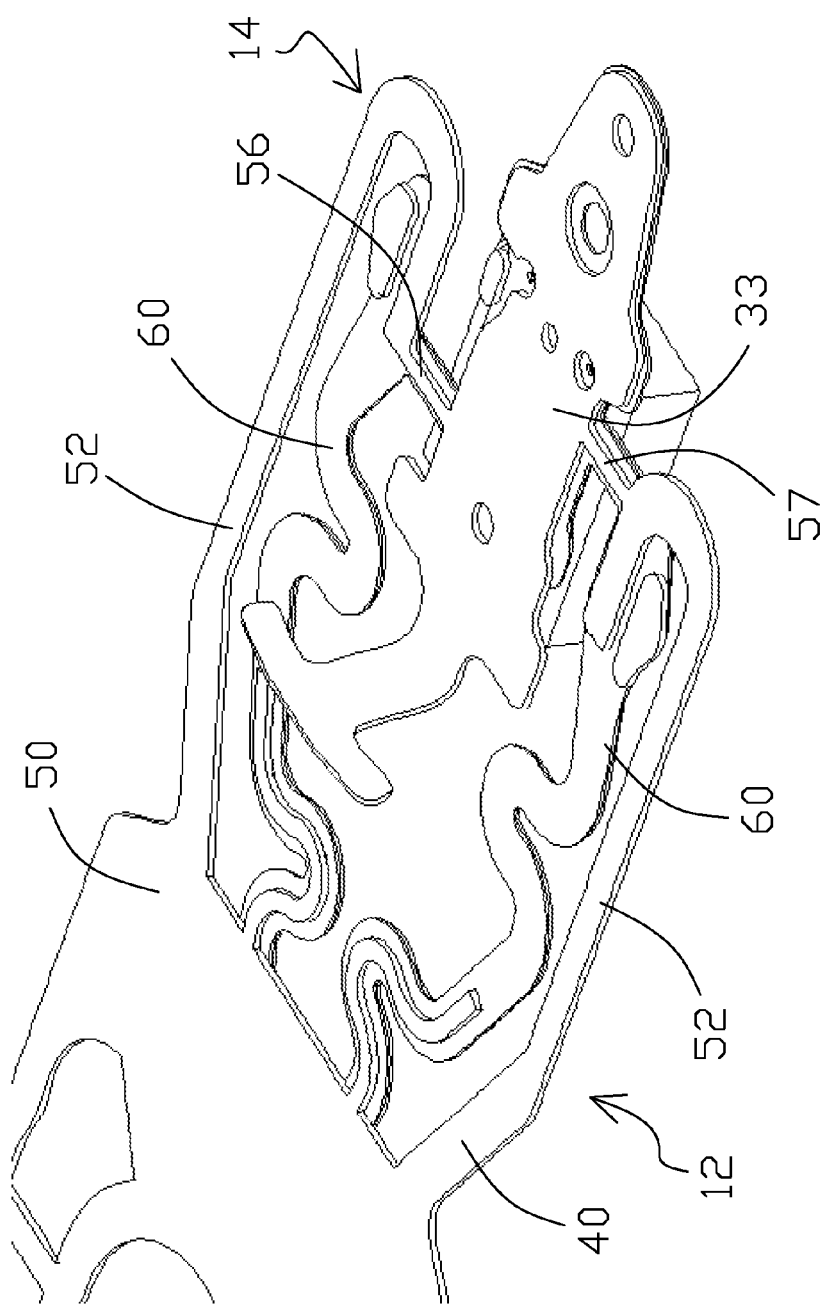
FIG. 5 is an isometric view of the flexure of FIGS. 1-4.
Figure 6:
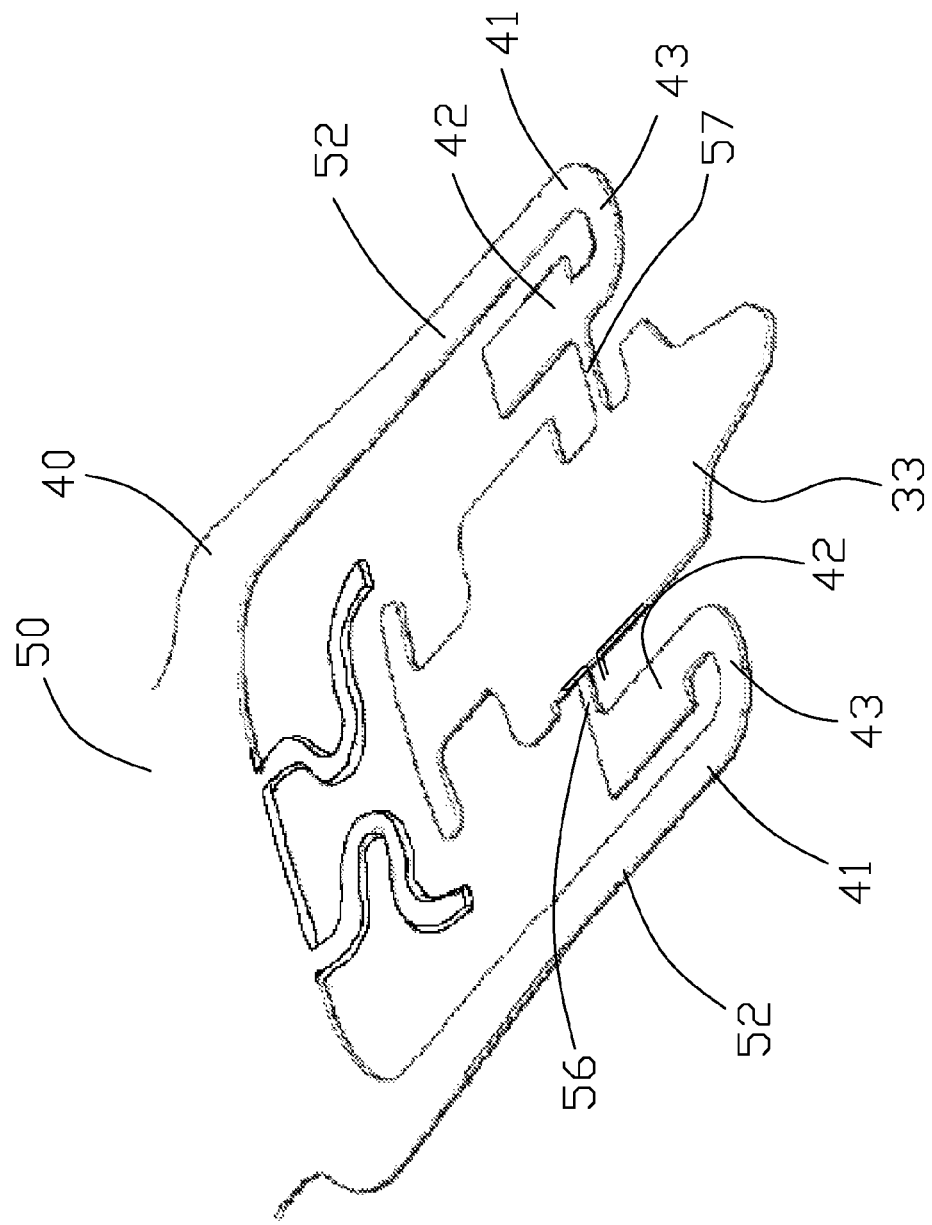
FIG. 6 is an isometric view of the metal layer of the flexure of FIGS. 1-5.

FIG. 5 is an isometric view of the flexure 12. The motor 34 has been removed relative to the view of FIG. 4 to show detail underneath the motor 34. FIG. 6 is an isometric view of the stainless steel layer 40. The trace 60 layer has been removed relative to the view of FIG. 5. As shown, the stainless steel layer 40 forms the spring arms 52, the struts 56, 57, and the tongue 33. Each spring arm 52 is elongated along the gimbal 24. The spring arms 52 are respectively on opposite lateral sides of the gimbal 24. The spring arms 52 support the tongue 33. The tongue 33 is an elongated portion (elongated along the X axis) that is located between the spring arms 52. As shown in FIG. 6, each of the spring arms 52 includes an outer arm portion 41 and an inner arm portion 42. Each outer arm portion 41 is continuous with a respective inner arm portion 42 via a distal bend 43 in the spring arm 52. The pair of struts 56, 57 is the only part of the stainless steel layer 40 that connects or otherwise supports the tongue 33 between the spring arms 52. Specifically, the struts 56, 57 can be the only structural linkage between the spring arms 52 and the tongue 33. Also, the struts 56, 57, in connecting with the tongue 33, can be the only part of the stainless steel layer 40 that connects between the spring arms 52 distal of the base portion 50. As shown, the struts 56, 57 can each be the narrowest part of the stainless steel layer 40 in an X-Y plane while the thickness of the stainless steel layer 40 can be consistent along the flexure 12. As shown, the struts 56, 57 are offset from one another. Specifically, strut 56 is located proximally with respect to strut 57. This offset arrangement facilitates rotational movement of the tongue 33. For example, as the motor 34 expands or contracts, the spring arms 52, on which opposite ends of the motor 34 are mounted, are laterally pushed outward or pulled inward, which correspondingly laterally pulls the struts 56, 57 outward or pushes the struts 56, 57 inward at the offset points at which the struts 56, 57 connect to the tongue 33. The pushing or pulling of the struts 56, 57 on the tongue 33 at the offset points applies a torque or moment to the tongue 33 between the struts 56, 57, which rotates the tongue 33.

Figure 7:
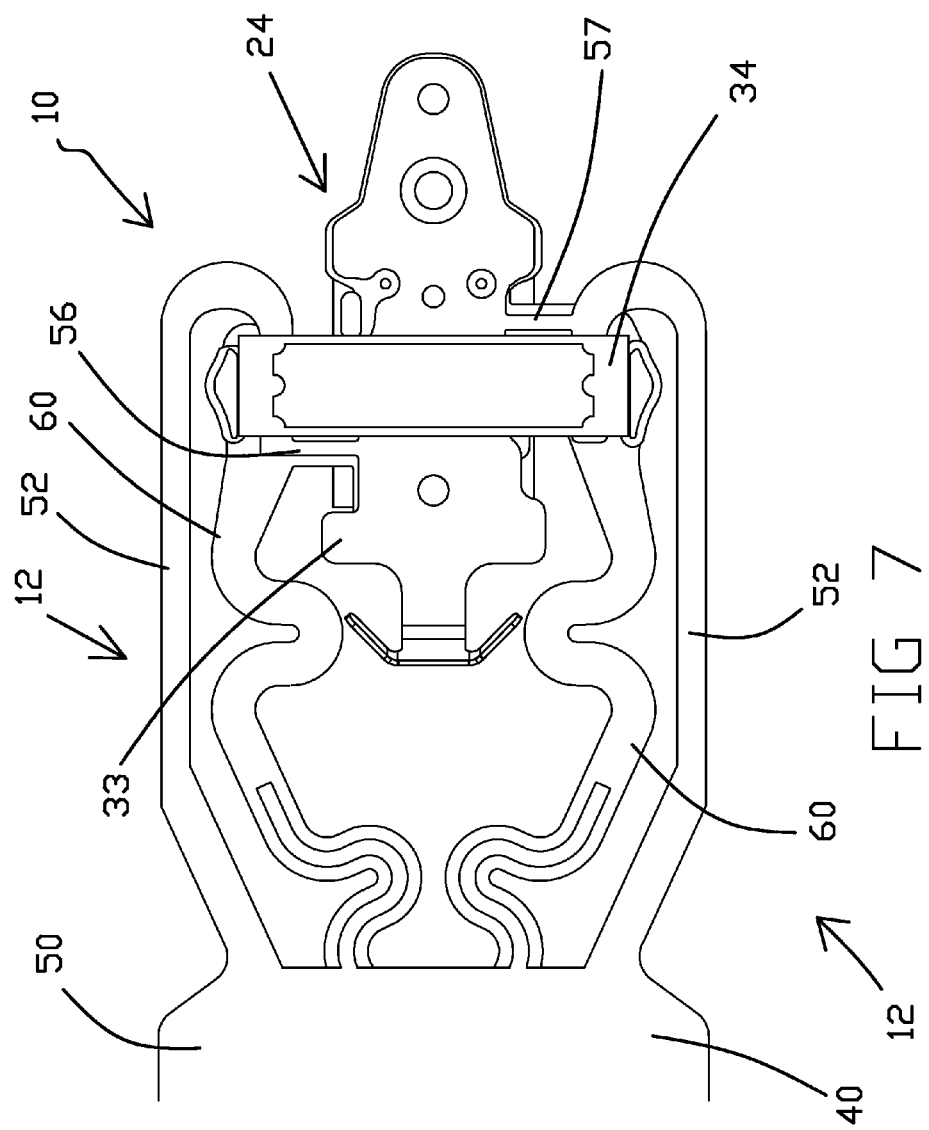
FIGS. 7-9 are plan views of the DSA structure of FIGS. 1-5 in different movement states.
Figure 8:
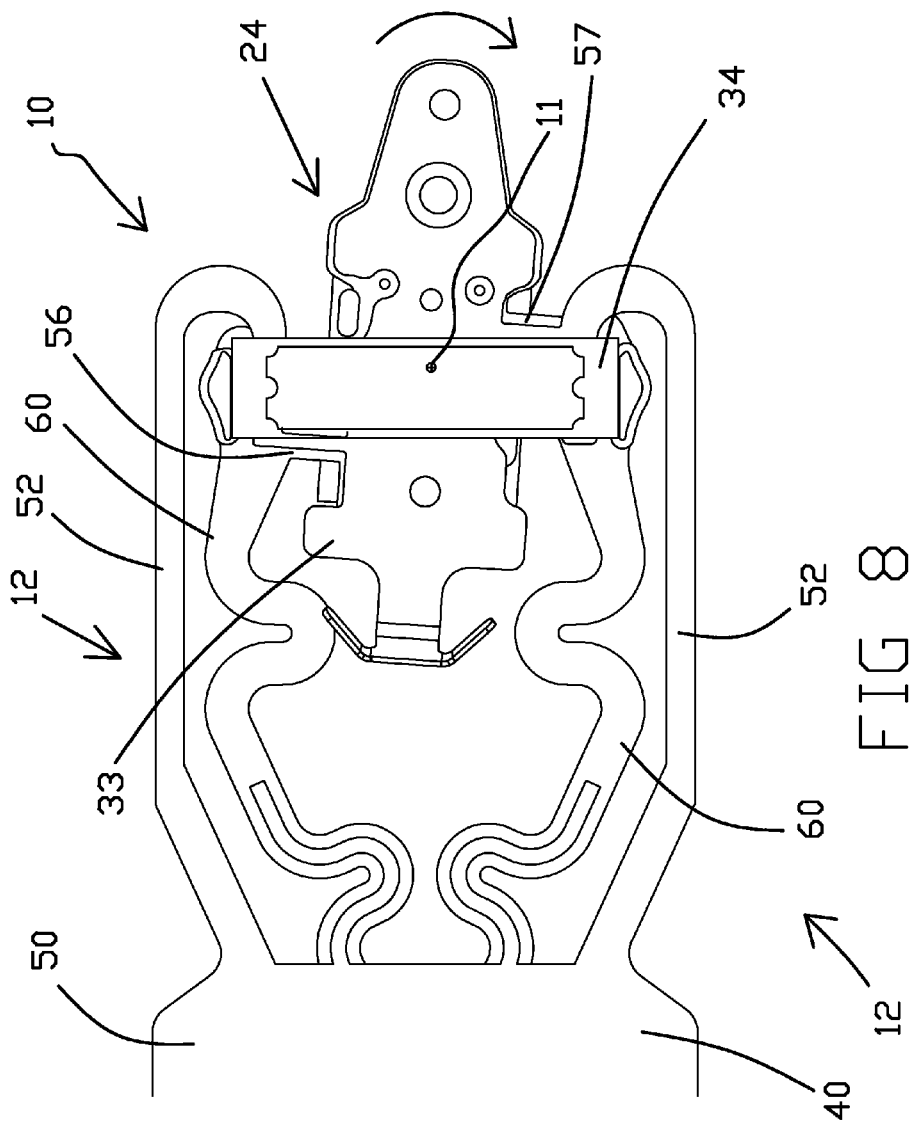

The operation of DSA structure 14 can be described with reference to FIGS. 7-9, each showing an overhead view of the flexure 12 during some stage of activation or non-activation of the motor 34. As shown in FIG. 7, the DSA structure 14 and motor 34 are in a neutral, undriven state with the tongue 33 generally centrally located between the spring arms 52 such that the longitudinal axis of the tongue 33 is parallel with the Y-axis. This corresponds to the state of the DSA structure 14 when no tracking drive signal is applied to the motor 34. As shown in FIG. 8, when a first potential (e.g., positive) tracking drive signal is applied to the motor 34, the shape of the motor 34 changes and its length generally expands. This change in shape, in connection with the mechanical action of the linkage including struts 56, 57, causes the tongue 33 to rotate about the axis or rotation 11 in a first direction. The lengthening of the motor 34 stretches the gimbal 24 laterally and causes the struts 56, 57 to bend. Because of the offset arrangement of the struts 56, 57, the struts 56, 57 bend such that the tongue 33 rotates in the first direction.

Figure 9:
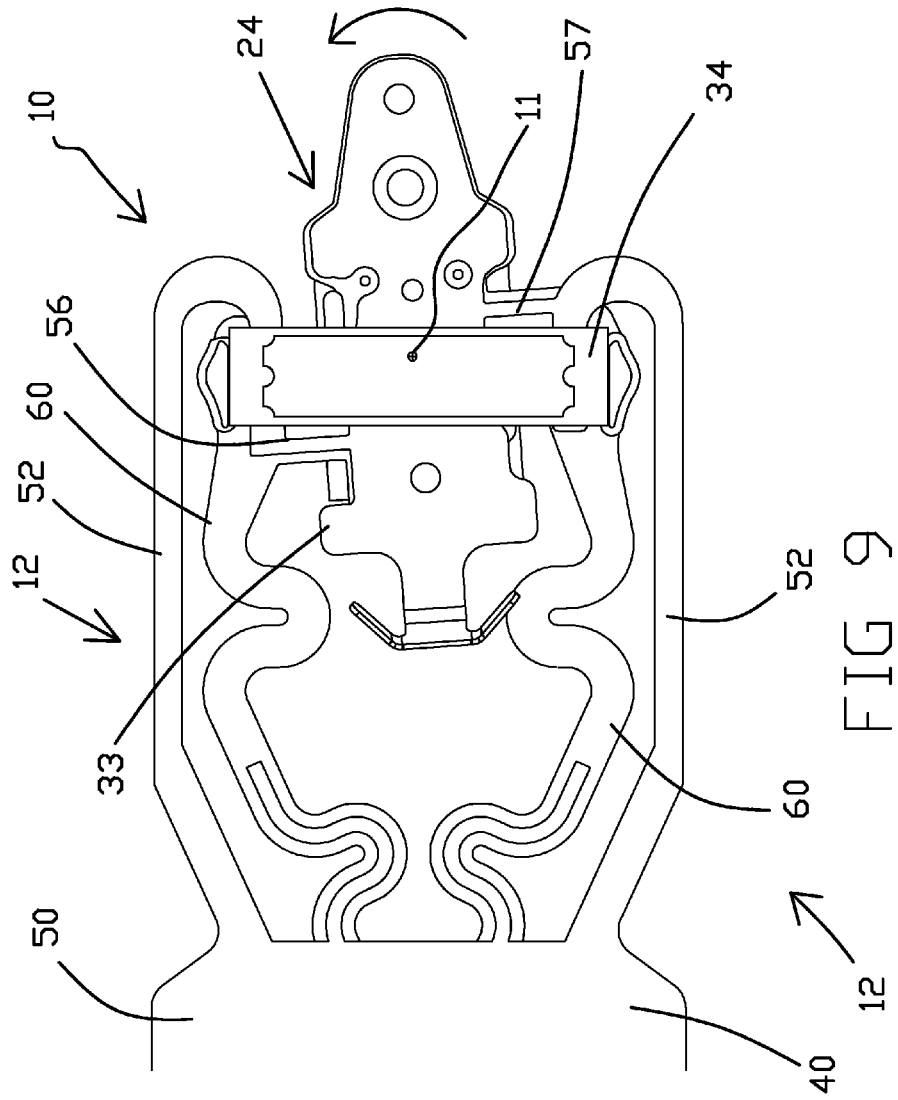

As shown in FIG. 9, when a second potential (e.g., negative) tracking drive signal is applied to the motor 34, the shape of the motor 34 changes and its length generally contracts. This change in shape, in connection with the mechanical action of the linking struts 56, 57, causes the tongue 33 to rotate in a second direction about the axis of rotation 11. The second direction is opposite the first direction. The shortening of the motor 34 compresses the gimbal 24 laterally and causes the struts 56, 57 to bend. Because of the offset arrangement of the struts 56, 57, the struts 56, 57 bend such that the tongue 33 rotates in the second direction. The head slider 32, not shown in FIGS. 8-10 but elsewhere shown as attached to the tongue 33, rotates with the tongue 33.

While not illustrated, the embodiments disclosed herein can utilize energy-assisted magnetic recording (EAMR). EAMR uses various types of energy to selectively change the coercivity of disk media, such as by heating a small area of the disk media to temporarily change the coercivity of the area just before writing. Various types of EAMR exist, such as heat-assisted magnetic recording (HAMR) and microwave assisted magnetic recording (MAMR). An EAMR element can be mounted on the tongue 33 (e.g., on a top surface of the tongue 33) and can project vertically up through the window 15 in the loadbeam 18. Embodiments of the present disclosure can include an EAMR element, such as in any manner disclosed in commonly assigned U.S. Provisional Patent Application No. 61/846,492, filed Jul. 15, 2013, titled DISK DRIVE SUSPENSION ASSEMBLY HAVING A PARTIALLY FLANGELESS LOAD POINT DIMPLE, which is incorporated by reference herein in its entirety for all purposes.

The term axis of rotation, as used herein, refers to the axis about which rotation of an element or structure is centered. The axis of rotation 11 of the tongue 33 is indicated in each of FIGS. 2, 3, 9, and 10. The axis of rotation 11 preferably extends through the center or apex of the dimple 36. If the axis of rotation 11 of the tongue 33 is not centered at the center or apex of the dimple 36, then the dimple 36 scrapes over the stiffener 39 or other dimple 36 engaging element (e.g., the motor 34), causing unwanted wobble in the DSA structure 14 and damaging the stiffener 39, motor 34, and/or the dimple 36, among other components.

The location of the axis of rotation 11 in the X-Y plane is based on multiple factors. For example, the weight balancing of the DSA structure 14 determines the center of mass of the tongue 33. The tongue 33 may have a propensity to rotate about its center of mass. The center of mass of the tongue 33 may not align with the dimple 36, resulting in a tendency for the axis of rotation 11 of the tongue 33 to not align with the dimple 36. Mass attached to the tongue 33, such as an EAMR element, influences the location of the center of mass of the tongue 33 and consequently the location of the axis of rotation 11 of the tongue 33. Also, the manner in which traces 60 are routed to connect with the tongue 33, or elements fixed to the tongue 33, can imbalance the tongue 33. For example, tension within the traces 60 can apply a force to the tongue 33, offsetting the rotational balance of the tongue 33. Rotational imbalance of the tongue 33 can increase sway gain.

As described above, adding features to the suspension 10, such as by routing the traces 60 between the spring arms 52 to minimize suspension width and/or adding an EAMR element, risks misbalancing the tongue 33 and increasing sway gain. However, the present disclosure provides features that counteract such misbalancing to preferably align the axis of rotation 11 of the tongue 33 with the center or apex of the dimple 36. For example, the components of the DSA structure 14 can be arranged to provide a moment of force that counteracts imbalance to align the axis of rotation 11 with the center or apex of the dimple 36, as further described herein.

Figure 10:
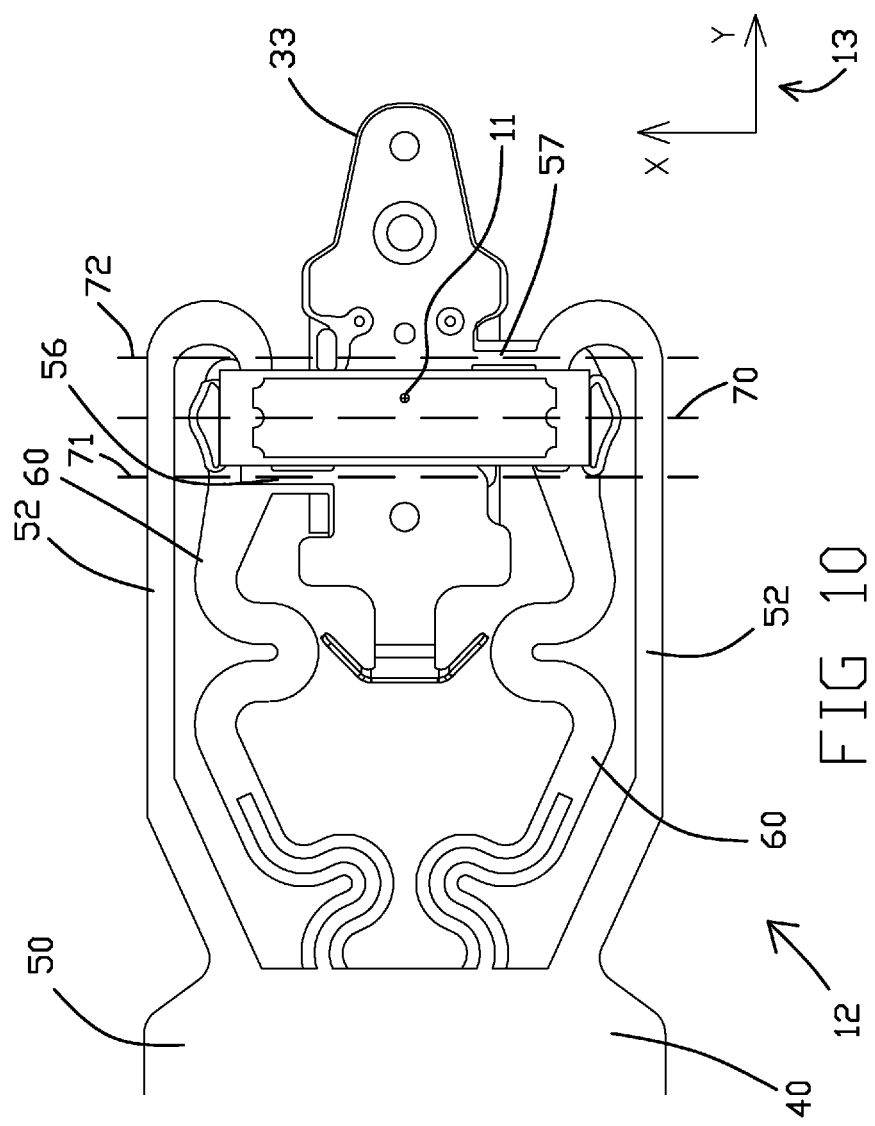
FIG. 10 is a plan view of the flexure of FIGS. 1-9.

FIG. 10 is a plan view of the flexure 12. Strut 56 is elongated along a longitudinal axis 71 that is aligned with the center of the strut 56. Strut 57 is elongated along a longitudinal axis 72 that is aligned with the center of the strut 57. The longitudinal axes 71, 72 extend generally perpendicular with the longitudinal axis of the suspension 10. The longitudinal axes 71, 72 of the struts 56, 57 extend parallel with respect to each other but do not intersect or otherwise overlap when the struts 56, 57 are not stressed (e.g., not bent in the inactive state of FIG. 10). The longitudinal axes 71, 72 of the struts 56, 57 are transverse (e.g., orthogonal) to the longitudinal axes (not marked) of each of the tongue 40, the gimbal assembly 24, and the loadbeam 18 as well as of the suspension 10 as a whole, each of which is parallel with the Y-axis. In some alternative embodiments, each strut 56, 57 can be pitched between the spring arms 52 and the tongue 33 such that each strut 56, 57 has a non-orthogonal orientation with respect to the longitudinal axis of the suspension 10.

A midline 70 indicates a center between the struts 56, 57. Specifically, the midline 70 is equidistant from the struts 56, 57 as measured along the Y-axis. The midline 70 extends parallel with the longitudinal axes 71, 72 of the struts 56, 57. In some alternative embodiments in which the struts 56, 57 are pitched as described above, the midline 70 could likewise be pitched to remain parallel with the longitudinal axes 71, 72.

The rotational force generated by the DSA structure 14 focuses a rotational force or torque between the struts 56, 57. Specifically, the rotational force is focused at the midline 70 between the struts 56, 57. As discussed previously, misbalance in the DSA structure 14, such as a counter weighted tongue 33, can move the center of mass of the tongue 33 away (e.g., distally) from the dimple 36 and therefore away from the preferred location for the center of rotation. The misbalance can be countered by locating the midline 70 offset from the dimple 36. The offset in the midline 70 creates a moment which can be equal and opposite to any tendency of the DSA structure 14 (e.g., from an offset center of mass associated with the tongue 33) to not rotate about the dimple 36. For example, the midline 70 between the struts 56, 57 being proximal of the dimple 36 (not shown but aligned with the axis of rotation 11) can counteract the center of mass of the tongue 33 being distal of the dimple 36. In various alternative embodiments, the midline 70 can be distal of the dimple 36 to counteract the center of mass of the tongue 33 being proximal of the dimple 36.

In various embodiments, a misbalanced tongue 33 may have a tendency to rotate about a first axis, the first axis not aligned with the dimple 36 due to the location of the center of mass of the tongue 33 not aligning with the dimple 36 and/or components (e.g., traces 60) applying a force to the tongue 33 along a vector that is offset from dimple 36. The first axis may be located one of proximal or distal of the dimple 36. The midline 70 can accordingly be the other of proximal or distal of the dimple 36. In some embodiments, the first axis is offset from the dimple 36 the same distance as the midline 70 is offset from the dimple 36. In some other embodiments, the first axis is offset from the dimple 36 by a different distance as the midline 70 is offset from the dimple 36. As indicated in FIGS. 8 and 9, the axis of rotation 11 is offset (distally) from the centerline of the motor 34. As used herein, a centerline of a motor refers to the axis of the motor that extends along the elongated dimension of the motor and is centered between the two opposing length-wise edges of the motor. For example, the centerline of the motor 34 is parallel with the midline 70 and equidistant from the proximal and distal edges of the motor 34.

Figure 11:
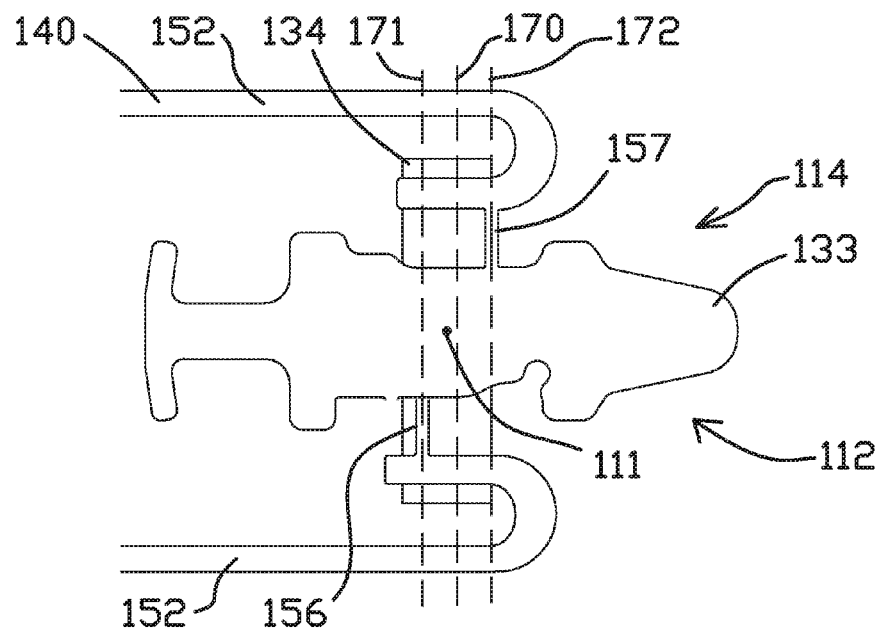
FIG. 11 is a plan view of a motor mounted on a metal layer of a flexure.
Figure 12:
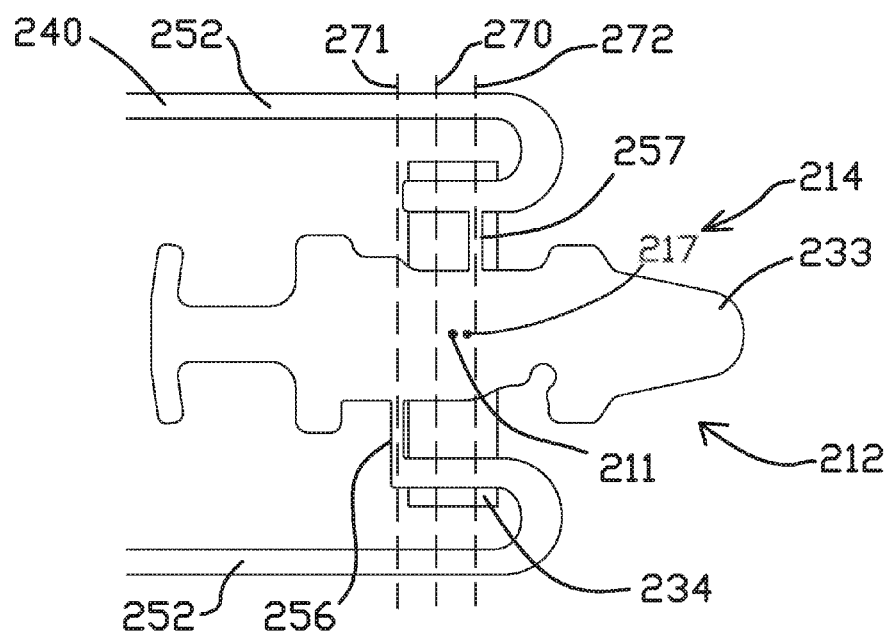
FIG. 12 is a plan view of a motor mounted on a metal layer of a flexure.
Figure 13:
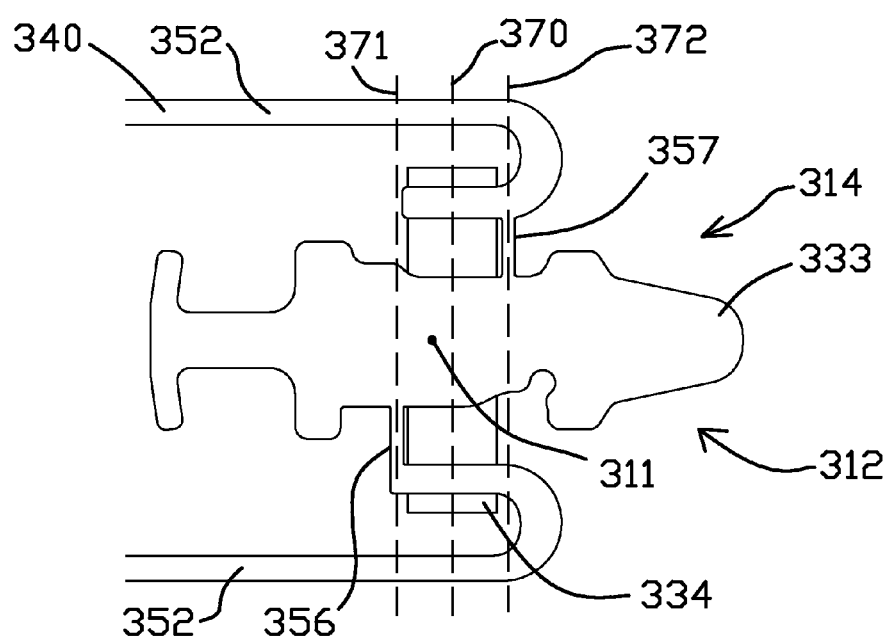
FIG. 13 is a plan view of a motor mounted on a metal layer of a flexure.

The midline 70 can be offset from the dimple 36 in various configurations. As shown in FIG. 7, the struts 56, 57 are entirely proximal and distal of the motor 34, respectively. Moreover, the distal edge of strut 56 is equidistant from the proximal edge of the motor 34 as compared to the distal edge of the motor 34 and the proximal edge of the strut 57. In some alternative embodiments, the distal edge of strut 56 is offset a first distance from the proximal edge of the motor 34 while the distal edge of the motor 34 is offset a second distance from the proximal edge of the strut 57, the first distance not being equal to the second distance. For example, the distal edge of strut 56 can be closer to the proximal edge of the motor 34 as compared to the distal edge of the motor 34 and the proximal edge of the strut 57, or the distal edge of strut 56 can be farther from the proximal edge of the motor 34 as compared to the distance between the distal edge of the motor 34 and the proximal edge of the strut 57. FIGS. 11-13 show various other offset configurations.

FIG. 11 shows a plan view of a DSA structure 114. Specifically, FIG. 11 shows the bottom side of a distal portion of a flexure 112 and a motor 134. Traces of the flexure 112 are not shown for clarity. The flexure 112 can be configured similarly to any other flexure of a suspension referenced herein unless otherwise described or illustrated. Features of the flexure 112 that are similar to those of other flexures are indicated by similar reference numbers. The flexure 112 includes a stainless steel layer 140 that forms spring arms 152, struts 156, 157, and a tongue 133 connected to the spring arms 152 by the struts 156, 157. Longitudinal axes 171, 172 of the struts 156, 157 extend parallel with respect to each other and with a midline 170 between the struts 156, 157. The midline 170 is equidistance from the struts 156, 157. As shown, strut 157 is aligned with the distal edge of the motor 134 and is only partially overlapped by motor 134. Strut 156 is entirely overlapped by the motor 134. Specifically, the strut 156 is offset distally from the proximal edge of the motor 134. Strut 156 is therefore not aligned with the proximal edge of the motor 134. In this way, the struts 156, 157 are not respectively symmetrically located with respect to the proximal and distal edges of the motor 134. Due to the asymmetry, the midline 170 is not aligned with the centerline of the motor 134. The axis of rotation 111 of the tongue 133 and the center or apex of the loadbeam dimple (not shown in FIG. 11, but is aligned with the axis of rotation 111 as previously shown) intersect the centerline of the motor 134. Therefore, the centerline of the motor 134, the axis of rotation 111, and the dimple, are each proximal of the midline 170 between the struts 156, 157. The offset of the midline 170 distally of the dimple counterbalances other factors, discussed herein, which would otherwise relocate the axis of rotation 111 of the tongue 133 to not align with the dimple.

FIG. 12 shows a plan view of a DSA structure 214. Specifically, FIG. 12 shows the bottom side of a distal portion of a flexure 212 and a motor 234. Traces of the flexure 212 are not shown for clarity. The flexure 212 can be configured similarly to any other flexure of a suspension referenced herein unless otherwise described or illustrated. Features of the flexure 212 that are similar to those of other flexures are indicated by similar reference numbers. The flexure 212 includes a stainless steel layer 240 that forms spring arms 252, struts 256, 257, and a tongue 233 connected to the spring arms 252 by the struts 256, 257. Longitudinal axes 271, 272 of the struts 256, 257 extend parallel with respect to each other and with a midline 270 between the struts 256, 257. The midline 270 is equidistance from the struts 256, 257. As shown, strut 257 is entirely overlapped by the motor 234. Specifically, the strut 257 is offset proximal of the distal edge of the motor 234. Strut 256 is proximal of the proximal edge of the motor 234 and is not overlapped to any degree by the motor 234. In this way, the struts 256, 257 are not respectively symmetrically located with respect to the proximal and distal edges of the motor 234. Due to the asymmetry, the midline 270 is not aligned with the centerline of the motor 234. The axis of rotation 211 of the tongue 212 and the center or apex of the loadbeam dimple (not shown in FIG. 12, but is aligned with the axis of rotation 211 as previously shown) intersect the centerline of the motor 234. The axis of rotation 211 of the tongue 212 is not aligned with the center of mass 217 of the tongue 212. Therefore, the centerline of the motor 234 and the axis of rotation 211 are both distal of the midline 270 between the struts 256, 257. The offset of the midline 270 proximally of the axis of rotation 211 and the dimple counterbalances other factors, discussed herein, which would otherwise relocate the axis of rotation 211 of the tongue 233 to not align with the dimple.

FIG. 13 shows a plan view of a DSA structure 314. Specifically, FIG. 13 shows the bottom side of a distal portion of a flexure 312 and a motor 334. Traces of the flexure 312 are not shown for clarity. The flexure 312 can be configured similarly to any other flexure of a suspension referenced herein unless otherwise described or illustrated. Features of the flexure 312 that are similar to those of other flexures are indicated by similar reference numbers. The flexure 312 includes a stainless steel layer 340 that forms spring arms 352, struts 356, 357, and a tongue 333 connected to the spring arms 352 by the struts 356, 357. Longitudinal axes 371, 372 of the struts 356, 357 extend parallel with respect to each other and with a midline 370 between the struts 356, 357. The midline 370 is equidistant from the struts 356, 357. As shown, strut 356 is not overlapped by the motor 334. Specifically, the strut 356 is offset a first distance proximally of the proximal edge of the motor 334. Strut 357 is not overlapped by the motor 334. Specifically, the strut 357 is offset a second distance distally of the distal edge of the motor 334. The first distance can equal the second distance. In this way, the struts 356, 357 are respectively symmetrically located with respect to the proximal and distal edges of the motor 334. The midline 370 between the struts 356, 357 aligns with a centerline of the motor 334. Such alignment and symmetry may provide advantages such as equivalent stresses in the struts 356, 357 and minimizing asymmetrical stresses in the motor 334 when activated. Nevertheless, the tongue 333 can be imbalanced for the reasons presented herein. Therefore, the assembly of the struts 356, 357 and the motor 334 can be located such that the midline 370 between the struts 356, 357 is not aligned with the axis of rotation 311 to counteract the imbalance. As shown in FIG. 13, the axis of rotation 311 is proximal of the midline 370 and the centerline of the motor 334. FIG. 13 demonstrates that it may be preferable to maintain alignment and symmetry of the struts 356, 357 and motor 334, unlike various previous embodiments, and instead moving the loadbeam dimple to align with the axis of rotation 311 to counteract imbalances in the DSA structure 314. Therefore, while not shown in FIG. 13, the dimple of the loadbeam associated with the flexure 312 can be moved to be aligned with the axis of rotation 311.

Figure 14:
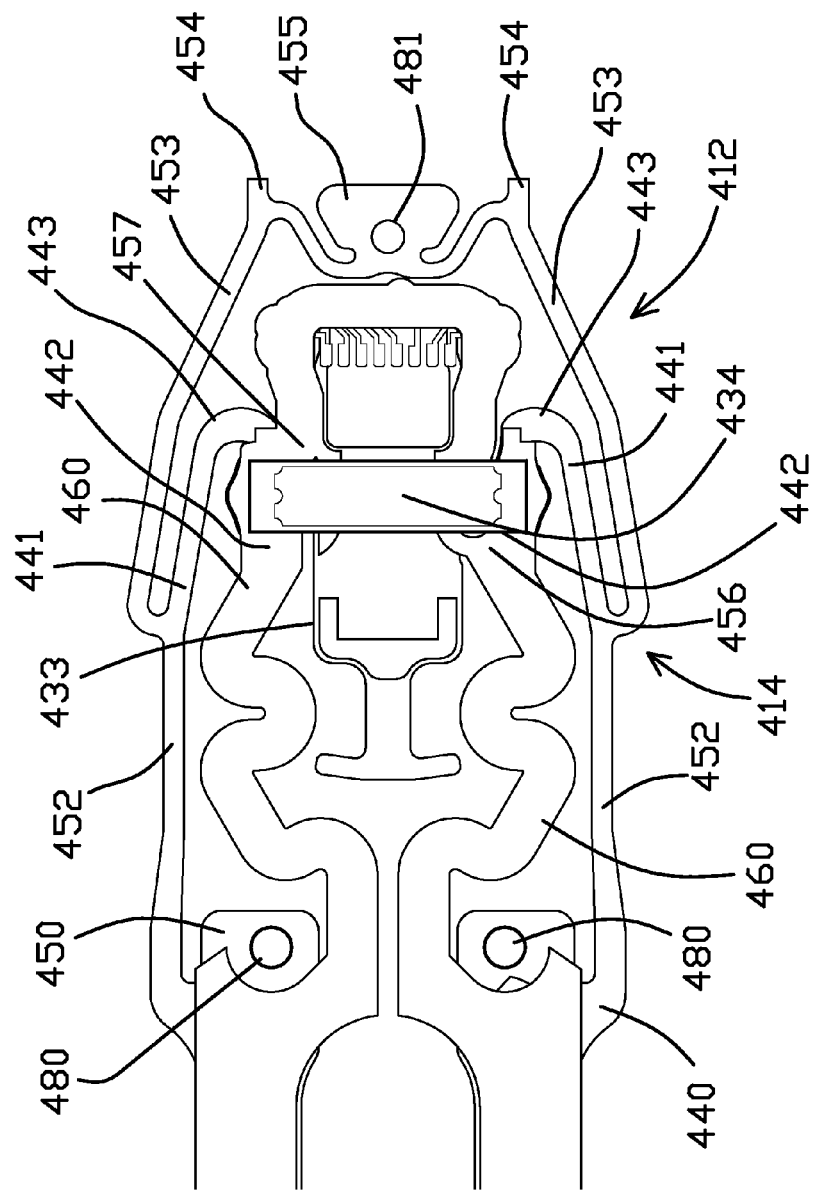
FIG. 14 is a plan view of a motor mounted on a flexure.

FIG. 14 shows a plan view of a DSA structure 414. Specifically, FIG. 14 shows a distal portion of a flexure 412 and a motor 434. The flexure 412 can be configured similarly to any other flexure of a suspension referenced herein unless otherwise described or illustrated. Features of the flexure 412 that are similar to those of other flexures are indicated by similar reference numbers. The flexure 412 includes a stainless steel layer 440 that forms a base portion 450, spring arms 452 that extend from the base portion 450, struts 456, 457 that extend transversely inward from the spring arms 452, and a tongue 433 connected to the struts 456, 457. Each of the spring arms 452 includes an outer arm portion 441 and an inner arm portion 442. Each outer arm portion 441 is continuous with a respective inner arm portion 442 via a distal bend 443 in the spring arm 452. The struts 456, 457 branch orthogonally from the inner arm portions 442 to connect with the tongue 433. The flexure 412 further includes a pair of extension arms 453 that attach to the outer arm portions 441 of the spring arms 452 on respective lateral left and right sides of the flexure 412. The pair of extension arms 453 extend distally from the outer arm portions 441. The pair of extension arms 453 include distal tips 454 at which point the pair of extension arms 453 extend laterally inward and proximally to connect to a distal portion 455. Each of the pair of extension arms 453 and the distal portion 455 can be formed from the stainless steel layer 440. The tongue 433 can be rotated by activation of the motor 434 as discussed herein. The tongue 433 can rotate about an axis of rotation, gimbal, and otherwise move with respect to the distal portion 455. Traces 460 extend along the distal end of the flexure 412. Traces 460 can be configured in any way referenced herein. The traces 460 are between the pair of spring arms 452 at least from the base portion 450 to the tongue 433.

The struts 456, 457 can have longitudinal axes and a midline centered therebetween as discussed and shown in other embodiments. The flexure 412 can be attached to a loadbeam (not shown in FIG. 14). Specifically, the flexure 412 can be welded or otherwise attached to the bottom side of a loadbeam at each of the proximal weld 480 and the distal weld 481. The dimple of the loadbeam is offset with the midline between the struts 456, 457 in any manner referenced herein to counteract tongue 433 imbalance and reduce sway gain. The dimple can engage the motor, an element mounted on the motor (e.g., a stiffener), or the tongue 433, for example, at a point of contact that is aligned with the axis of rotation of the tongue.

Figure 15:
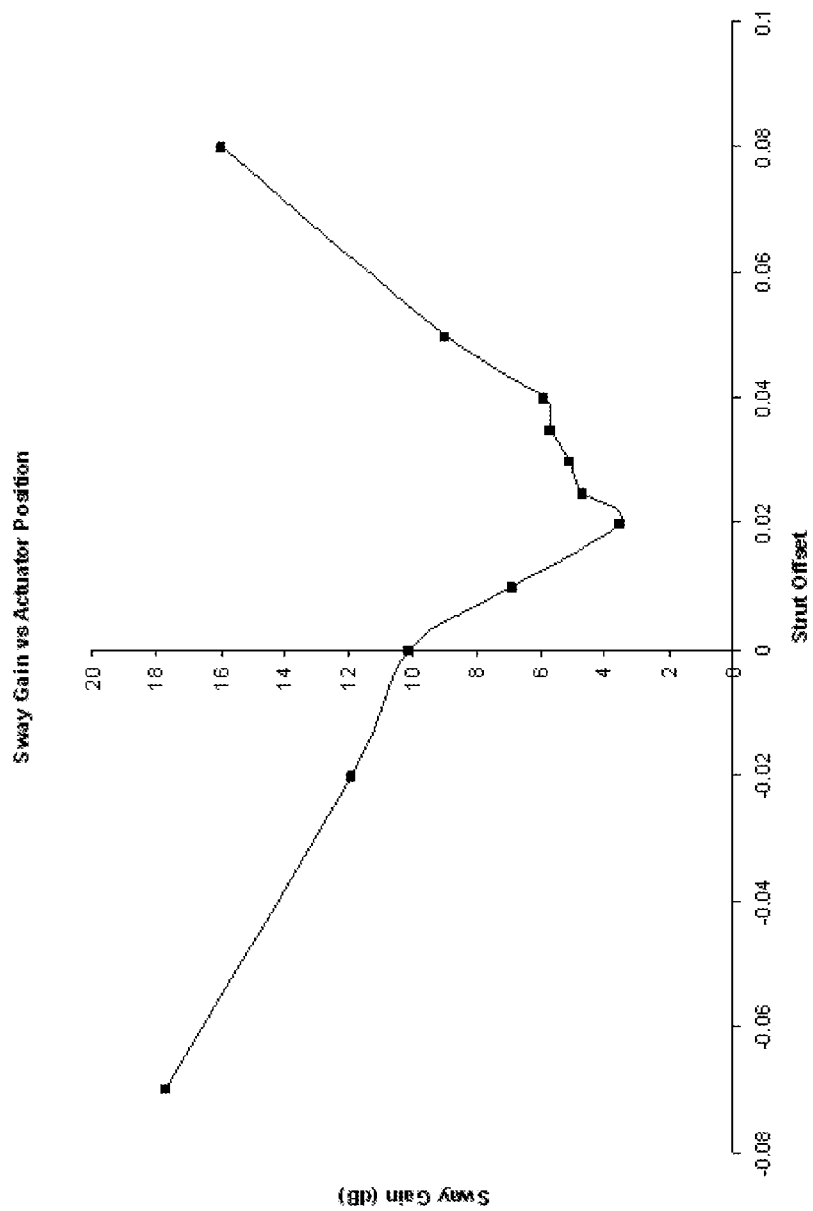
FIG. 15 is plot of data demonstrating the relationship between sway gain and offset between a dimple and struts.

FIG. 15 is a plot of test data. The plot shows the relationship between sway gain (Y axis) and the position of a midline between distal and proximal struts (X axis) in an embodiment similar to that shown in FIG. 7. The midline between the struts was aligned with the dimple at zero on the plot, and then the midline was shifted proximally and distally by changing the position of one strut (which changed the location of the midline). As can be seen, the shifting of the midline in one direction undesirably increases sway gain but shifting the midline in the other direction reduces sway gain for a limited window before further shifting increases sway gain. Such data demonstrates, among other things, that offsetting the midline between the struts from the dimple can desirably reduce sway gain by introducing a moment that counteracts other imbalance in the DSA structure.

Although exemplar embodiments are presented herein to demonstrate various features of the present invention, various modifications are contemplated as being within the scope of the present disclosure. For example, while a dimple has been presented herein as an exemplar load point projection, any type of load point projection can be substituted, such as a peg or other shape. Also, while the dimple has been described as being part of the loadbeam, and impinging on the flexure or element mounted on the flexure, the dimple could instead be located on the DSA structure (e.g., flexure, motor, stiffener) and engage a planar portion of the loadbeam at a point of contact. For example, the location of an axis of rotation is indicated overlaid tongues, motors, and/or stiffeners in various embodiments presented herein. Also, being that the loadbeam dimple is aligned with the location of the axis of rotation in the X-Y plane in various embodiments, the indicated location of the axis of rotation corresponds to the point of contact of the dimple on the tongue, motor, stiffener, or other element. Therefore, while the location of the dimple is discussed in various embodiments, the location of the point of contact (e.g., between an element of a DSA structure and the dimple or other load point projection) can be substituted for reference to the dimple.

Figure 16:
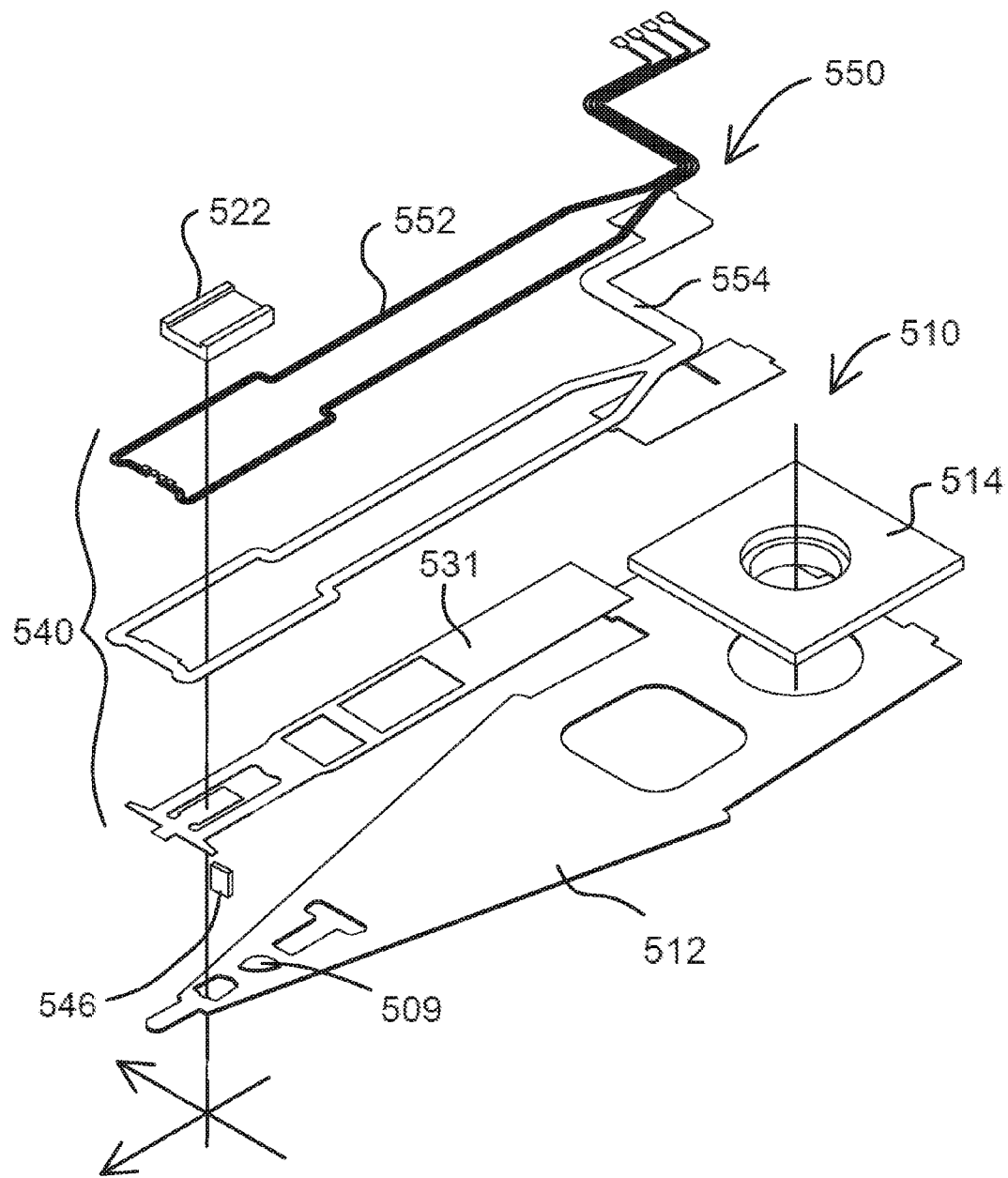
FIG. 16 is an exploded view of a head suspension assembly.

As shown in FIG. 16, a head suspension 510 is comprised of a plurality of separate components that are mounted together. Head suspension 510 includes a load beam 512 to which a flexure 540 is mounted. The load beam 512 is mounted to a base plate 514. A flexure 540 is mounted to the load beam 512 and provides a resilient connection between the load beam 512 and slider 522. A dimple 509 is on the load beam 512.

Figure 17:
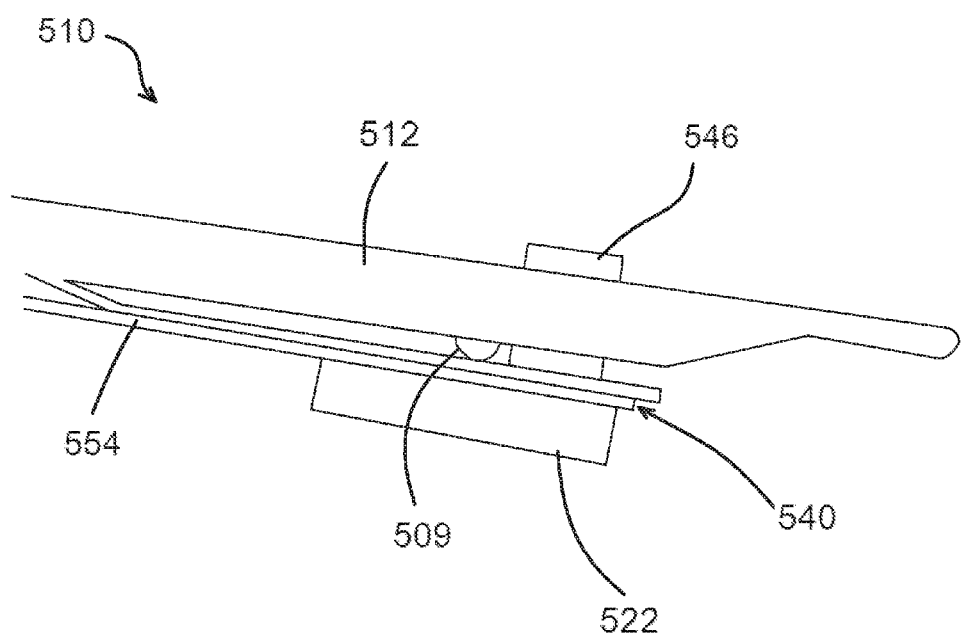
FIG. 17 is a side view of a distal portion of a head suspension assembly.

The flexure 540 also includes a trace assembly 550 that provides electrical interconnection between the slider 522 and a microprocessor (not shown). The trace assembly 550 of the shown embodiment is comprised of a conductive layer 552 formed into longitudinal traces that extend along the length of the flexure 540 and an insulating layer 554 interposed between a spring metal layer 531 and the conductive layer 552. FIGS. 16 and 17 show a HAMR block 546 which can mount to the flexure 540.

The embodiments of the present disclosure can be modified with any feature disclosed in commonly owned U.S. patent application Ser. No. 13/972,137, filed Aug. 21, 2013, titled CO-LOCATED GIMBAL-BASED DUAL STAGE ACTUATION DISK DRIVE SUSPENSIONS WITH OFFSET MOTORS; U.S. patent application Ser. No. 14/026,427, filed Sep. 13, 2013, titled CO-LOCATED GIMBAL-BASED DUAL STAGE ACTUATION DISK DRIVE SUSPENSIONS; U.S. patent application Ser. No. 14/044,238, filed Oct. 2, 2013, titled CO-LOCATED GIMBAL-BASED DUAL STAGE ACTUATION DISK DRIVE SUSPENSIONS WITH MOTOR STIFFENERS; and U.S. patent application Ser. No. 14/050,660, filed Oct. 10, 2013, titled CO-LOCATED GIMBAL-BASED DUAL STAGE ACTUATION DISK DRIVE SUSPENSIONS WITH DAMPERS, each of which is incorporated herein in its entirety for all purposes. Moreover, any of the embodiments of such disclosures can be modified in view the present disclosure. For example, a midline between struts of any of the embodiments can be offset with respect to a dimple or other load point projection to counteract imbalance in a DSA structure to reduce sway gain.

Although the present invention has been described with reference to preferred embodiments, those skilled in the art will recognize that changes can be made in form and detail without departing from the spirit and scope of the invention. For example, although described in connection with certain co-located DSA structures, stiffeners and associated features described herein can be used in connection with motors on other DSA structures, including other co-located DSA structures.

The following is claimed:

1. A suspension having a dual stage actuation (DSA) structure on a gimbaled flexure comprising:
    a loadbeam having a load point dimple;
    a flexure attached to the loadbeam, the flexure comprising
        a metal layer, the metal layer comprising:
        a pair of spring arms;
        a tongue located between the spring arms; and
        a pair of elongated struts, the struts spanning from the pair of spring arms to the tongue to connect the pair of spring arms to the tongue, wherein the longitudinal axes of the struts are parallel and offset with respect to each other, and the midline between the pair of struts is equidistant from the pair of struts; and
    a motor mounted on the flexure, wherein electrical activation of the motor bends the pair of struts to rotate the tongue about an axis of rotation, the axis of rotation is aligned with the dimple, the midline is offset from the axis of rotation and the dimple, the center of mass of the tongue is located one of distally or proximally of the axis of rotation, and the midline between the pair of struts is located the other of distally or proximally of the axis of rotation.

2. The suspension of claim 1, further comprising a heat-assisted magnetic recording element mounted on the tongue, wherein the center of mass of the tongue is imbalanced at least in part due to the heat-assisted magnetic recording element mounted on the tongue.

3. The suspension of claim 1, wherein the axis of rotation is located distally of a first one of the pair of struts and proximally of a second one of the pair of struts.

4. The suspension of claim 1, wherein the offset between the dimple and the midline between the struts counters a tendency of the tongue to rotate about a first axis of rotation that is not aligned with the dimple.

5. The suspension of claim 1, wherein a first strut of the pair of struts is located proximal of the motor and a second strut of the pair of struts is located distal of the motor.

6. The suspension of claim 1, wherein each strut of the pair of struts is overlapped by the motor.

7. The suspension of claim 1, wherein a first strut of the pair of struts is overlapped by the motor and a second strut of the pair of struts is not overlapped by the motor.

8. The suspension of claim 1, wherein a first strut of the pair of struts is located proximal of a second strut of the pair of struts, the first strut located a first distance from a proximal edge of the motor and the second strut located a second distance from a distal edge of the motor, and the first distance is equal to the second distance such that the pair of struts is symmetrically positioned with respect to the motor.

9. The suspension of claim 1, wherein a first strut of the pair of struts is located proximal of a second strut of the pair of struts, the first strut located a first distance from a proximal edge of the motor and the second strut located a second distance from a distal edge of the motor, and the first distance is not equal to the second distance such that the pair of struts is asymmetrically positioned with respect to the motor.

10. The suspension of claim 1, further comprising a pair of traces, each trace comprising one or more insulated conductors, wherein the metal layer further comprises a base portion from which the pair of spring arms extend distally.

11. The suspension of claim 10, wherein the pair of traces extend from the base portion to the tongue without extending laterally beyond the pair of spring arms.

12. The suspension of claim 11, wherein the metal layer further comprises a pair of snake tethers that extend distally from the base portion, the pair of snake tethers respectively supporting the traces.

13. The suspension of claim 12, wherein each trace comprises at least two flexible bends located between the pair of spring arms.

14. The suspension of claim 1, further comprising a stiffener located on the motor, wherein the dimple impinges on the stiffener at a point of contact, the point of contact aligned with the axis of rotation.

15. The suspension of claim 1, wherein the flexure is cantilevered from the loadbeam and gimbaled about the dimple.

16. The suspension of claim 1, wherein opposite ends of the motor are respectively mounted on the spring arms.

17. The suspension of claim 1, further comprising a slider mounted on a first side of the tongue, wherein the motor is located along a second side of the tongue that is opposite the first side of the tongue.

18. The suspension of claim 1, wherein the two narrowest sections of the metal layer define the pair of struts.

19. The suspension of claim 1, wherein the pair of struts are the only part of the metal layer that connects between the pair of spring arms and the tongue.

20. The suspension of claim 1, wherein each spring arm comprises an outer arm portion, an inner arm portion, and a distal bend that connects the inner arm portion to the outer arm portion, and wherein the pair of struts respectively connect to the inner arm portions of the pair of spring arms.

21. The suspension of claim 1, wherein the metal layer is a layer of stainless steel.

22. The suspension of claim 1, wherein the longitudinal axes of the struts are orthogonal to the longitudinal axis of the suspension.

23. A suspension having a DSA structure on a gimbaled flexure comprising:
 a loadbeam having a load point dimple;
 a flexure attached to the loadbeam, the flexure comprising a metal layer, the metal layer comprising:
  a pair of spring arms;
  a tongue located between the spring arms;
  a pair of struts, each strut comprising a first end connecting to a respective one of the pair of spring arms and a second end connecting to the tongue, one of the struts located distal of the other strut, the pair of struts having a midline centered between the pair of struts, wherein the pair of struts are the only part of the metal layer that connects between the pair of spring arms and the tongue; and
 a motor mounted on the flexure, wherein electrical activation of the motor bends the pair of struts to rotate the tongue about an axis of rotation, the axis of rotation is aligned with the dimple, and the midline is offset distally or proximally with respect to the axis of rotation.

24. The suspension of claim 23, wherein the center of mass of the tongue is located one of distally or proximally of the axis of rotation, and the midline between the struts is located the other of distally or proximally of the axis of rotation.

25. The suspension of claim 23, wherein the offset between the dimple and the midline between the struts counters a tendency of the tongue to rotate about a first axis of rotation that is not aligned with the dimple.

26. The suspension of claim 23, wherein each spring arm comprises an outer arm portion, an inner arm portion, and a distal bend that connects the inner arm portion to the outer arm portion, and wherein the pair of struts respectively connect to the inner arm portions of the pair of spring arms.

27. The suspension of claim 23, wherein a first strut of the pair of struts is located proximal of a second strut of the pair of struts, the first strut located a first distance from a proximal edge of the motor and the second strut located a second distance from a distal edge of the motor, and the first distance is not equal to the second distance such that the pair of struts is asymmetrically positioned with respect to the motor.

28. The suspension of claim 23, wherein the axis of rotation is located distally of a first one of the pair of struts and proximally of a second one of the pair of struts.

29. A suspension having a DSA structure on a gimbaled flexure comprising:
 a loadbeam having a load point dimple;
 a flexure attached to the loadbeam, the flexure comprising a metal layer, the metal layer comprising:
  a pair of spring arms;
  a tongue located between the spring arms, the tongue comprising a slider mounting;
  a pair of struts, the struts connecting the pair of spring arms to the tongue, the pair of struts comprising a first strut and a second strut located distal of the first strut, wherein the pair of struts are the only part of the metal layer that connects between the pair of spring arms and the tongue; and
 a motor mounted on the flexure, wherein electrical activation of the motor bends the pair of struts to rotate both the tongue and the slider mounting about an axis of rotation, the first strut is located a first distance proximally of the axis of rotation, the second strut is located a second distance distally of the axis of rotation, and the first distance is different than the second distance.

30. The suspension of claim 29, further comprising a loadbeam having a load point dimple, the load point dimple aligned with the axis of rotation.

* * * * *